US012583060B2

(12) United States Patent
Iijima et al.

(10) Patent No.: US 12,583,060 B2
(45) Date of Patent: Mar. 24, 2026

---

(54) SOLDER ALLOY, SOLDER BALL AND SOLDER JOINT

(71) Applicant: SENJU METAL INDUSTRY CO., LTD., Tokyo (JP)

(72) Inventors: Yuki Iijima, Tokyo (JP); Shunsaku Yoshikawa, Tokyo (JP); Kanta Dei, Tokyo (JP); Takahiro Matsufuji, Tokyo (JP); Kota Sugisawa, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 311 days.

(21) Appl. No.: 18/033,750

(22) PCT Filed: Nov. 17, 2021

(86) PCT No.: PCT/JP2021/042233
§ 371 (c)(1),
(2) Date: Apr. 25, 2023

(87) PCT Pub. No.: WO2022/107806
PCT Pub. Date: May 27, 2022

(65) Prior Publication Data
US 2023/0398643 A1      Dec. 14, 2023

Related U.S. Application Data

(60) Provisional application No. 63/115,611, filed on Nov. 19, 2020.

(51) Int. Cl.
*B23K 35/26*      (2006.01)
*B23K 35/02*      (2006.01)
*C22C 13/02*      (2006.01)
*B23K 101/40*      (2006.01)

(52) U.S. Cl.
CPC ........ *B23K 35/262* (2013.01); *B23K 35/0244* (2013.01); *C22C 13/02* (2013.01); *B23K 2101/40* (2018.08)

(58) Field of Classification Search
CPC .... B23K 35/262; B23K 35/0244; C22C 13/02
See application file for complete search history.

(56) References Cited

U.S. PATENT DOCUMENTS

2002/0051728 A1*  5/2002  Sato ......................... B22F 1/065
                                                              75/335
2009/0304545 A1* 12/2009  Tanaka ................... B23K 35/26
                                                              420/560

2014/0328719 A1* 11/2014  Chen ...................... B23K 35/26
                                                              420/561
2015/0146394 A1   5/2015  Terashima et al.
2016/0023309 A1   1/2016  Choudhury et al.
2016/0214212 A1*  7/2016  Tachibana ............... H01L 24/13
2016/0368102 A1  12/2016  Nishimura et al.
2018/0102464 A1   4/2018  de Avila Ribas et al.
2020/0140975 A1   5/2020  Nishimura et al.

FOREIGN PATENT DOCUMENTS

| | | |
|---|---|---|
| CN | 101716703 A | 6/2010 |
| CN | 101801588 A | 8/2010 |
| CN | 102066043 A | 5/2011 |
| CN | 105189027 A | 12/2015 |
| EP | 2275224 A1 | 1/2011 |
| EP | 3040152 A1 | 7/2016 |
| JP | 2000-015476 A | 1/2000 |
| JP | 4144415 | 6/2008 |
| JP | 2014-217888 | 11/2014 |
| JP | 2018-023987 | 2/2018 |
| JP | 2018-058090 | 4/2018 |
| JP | 2019-147173 | 9/2019 |
| JP | 6700568 | 5/2020 |
| JP | 2021-126686 | 9/2021 |
| JP | 2021-178350 | 11/2021 |
| JP | 2021-1178350 | 11/2021 |
| TW | 201442818 A | 11/2014 |
| TW | 201615854 A | 5/2016 |
| TW | 202028488 A | 8/2020 |
| WO | WO 2015/166945 | 11/2015 |

OTHER PUBLICATIONS

Taiwanese Office Action in Aptent Application No. 113101418, with English Translation, mailed May 16, 2025, (6 pages).
Taiwan Search Report for Application No. 110142774, mailed Aug. 24, 2023 (9 pages).
European Search Report for App. No. 21894680.4, dated Apr. 11, 2024 (9 pages).
Japanese Notice of Allowance for Application No. 2022-097574, Aug. 16, 2022 (3 pages).
International Search Report for Application No. PCT/JP2021/04223, mailed Feb. 1, 2022 (6 pages).
Supplementary Partial European Search Report (Application No. 21894680.4) mailed Aug. 7, 2023, (37 pages).
Chinese Office Action in Chinese Application No. 202180077121.4, dated Jan. 30, 2026, with English Translation (19 pages).

* cited by examiner

*Primary Examiner* — Alexandra M Moore
(74) *Attorney, Agent, or Firm* — NIXON PEABODY LLP; Jeffrey L. Costellia

(57)        ABSTRACT

The present invention employs a lead-free and antimony-free solder alloy which has an alloy composition that contains from 1.0% by mass to 4.0% by mass of Ag, from 0.1% by mass to 1.0% by mass of Cu, from 0.1% by mass to 9.0% by mass of Bi, from 0.005% by mass to 0.3% by mass of Ni and from 0.001% by mass to 0.015% by mass of Ge, with the balance being made up of Sn.

21 Claims, No Drawings

SOLDER ALLOY, SOLDER BALL AND SOLDER JOINT

The present invention relates to a lead-free and antimony-free solder alloy, solder ball, and solder joint. The present invention claims priority on the basis of U.S. Patent Application No. 63/115,611, filed in the United States on Nov. 19, 2020, the contents of which are incorporated herein by reference.

TECHNICAL FIELD

Background of the Invention

In recent years, electronic devices have been required to have higher integration, larger capacity and higher speed. For example, a semiconductor package such as QFP (Quad Flat Package) is used, and higher integration and high functionality at the semiconductor chip level is being pursued.

In the manufacture of QFP, a packaging process of die bonding a silicon chip cut from a silicon wafer to a lead frame is employed.

In QFP which is obtained by bonding microelectrodes such as BGA (Ball Grid Array), a solder joint is formed by die bonding a silicon chip and a lead frame with a solder alloy.

In a microelectrode such as BGA, solder bumps are formed by using solder balls. When solder balls are used, an adhesive flux is applied to the microelectrode, and the solder balls are placed on the electrode coated with the flux. Then, the solder balls are melted by heating in a reflow furnace to allow the molten solder to wet the microelectrode, thereby forming solder bumps on the microelectrode.

In contrast, Sn—Ag—Cu solder alloys have been widely used conventionally, and are used in the form of solder balls as well as in die bonding.

When the solder alloy is used, it may be necessary to improve heat-cycling resistance, impact resistance, and discoloration resistance among various requirements in recent years. Therefore, in order to improve these characteristics, various studies have been made on Sn—Ag—Cu solder alloys that have been widely used conventionally.

For example, Patent Document 1 discloses a solder alloy in which Ni and Ge are added to a Sn—Ag—Cu solder alloy as optional elements. It is disclosed that this solder alloy exhibits heat-cycling resistance when Ni is contained, and exhibits impact resistance and discoloration resistance when Ge is contained.

DOCUMENTS OF RELATED ART

Patent Documents

Patent Document 1: Japanese Patent No. 4144415

SUMMARY OF THE INVENTION

Problems to be Solved by the Invention

Thus, the solder alloy (Sn—Ag—Cu—Ni—Ge solder alloy) disclosed in Patent Document 1 is an excellent alloy which can simultaneously achieve the three kinds of effects, namely, impact resistance, discoloration resistance, and heat-cycling resistance.

However, there seems to be room for further improvement with regard to alloy configuration.

Although each element has its specific significance to be added to the solder alloy, the solder alloy is an integrated object formed by the combination of all constituent elements and the constituent elements influence each other, and therefore the constituent elements need to be contained in a well-balanced manner as a whole.

It seems that the amount of each constituent element in the solder alloy described in Patent Document 1 is individually optimized, and the alloy constitution thereof is sufficient to exhibit effects as described in Patent Document 1 at the time of the filing of Patent Document 1.

However, in order to improve another property of a solder alloy containing the same constituent elements so as to adapt to recent demands, it is necessary to individually optimize the amount of each constituent element, and then include the constituent elements in a well-balanced manner as a whole.

In the invention described in Patent Document 1, an alloy configuration is determined on the assumption that a solder ball is placed on a microelectrode such as BGA.

Therefore, the mechanical strength is required to be improved when soldering is conducted using a Sn—Ag—Cu—Ni—Ge solder alloy.

In the present specification, the mechanical strength may be indicated as shear strength or tensile strength.

Thus, in recent years, electronic devices having higher integration, larger capacity and higher speed have required solder alloys that can be applied not only to BGA but also to die bonding used in QFP.

An objective of the present invention is to provide a lead-free and antimony-free solder alloy, solder ball, and solder joint which have a melting point of around 230° C. and a tensile strength of 50 MPa or more.

Means to Solve the Problems

Although a solder alloy is composed of two or more elements, and effects of each element may individually affect the properties of an entire solder alloy, all the constituent elements form an integral body as described above, and therefore the constituent elements are related to each other.

The present inventors have focused on alloy configuration by which the shear strength is improved to allow the solder alloy to be applied not only to BGA but also to QFP even when constituent elements thereof are identical to those of the solder alloy described in Patent Document 1.

Conventionally, when a substrate using Pb is discarded, acid rain may cause Pb to elute from the substrate and to flow into groundwater. Then, it may affect the human body by accumulating in livestock and humans from groundwater. Therefore, Pb has been designated as a regulated substance by the RoHS Directive. Furthermore, in recent years, for environmental and health reasons, there has been a growing demand to avoid the use of not only Pb but also Sb that may improve the heat-cycling properties of Sn-based solder alloys, and therefore achieving the desired properties in a lead-free and antimony-free condition has been investigated.

In a QFP obtained by joining microelectrodes such as BGA (Ball Grid Array), a silicon chip and a lead frame are die-bonded with a solder alloy to form a solder joint.

A back metal having a Ni layer on an outermost layer is formed on the silicon chip, for example, in order to improve the wettability with the solder and to improve the adhesion strength.

When the outermost Ni layer comes into contact with a molten solder, the Ni layer melts in the molten solder and Ni leaching is caused. A barrier layer such as Ti is usually formed on a back metal in order to prevent Ni from diffusing into a silicon chip. When Ni leaching progresses and the Ti layer is exposed, the back metal wets and repels the molten solder because the wettability of the solder alloy to Ti is very poor. Furthermore, even if a small amount of Ni layer remains, Ni atoms diffuse into the molten solder, while Ti hardly diffuses into Ni. Accordingly, voids increase at the atomic level at an interface between the Ti layer, which is a barrier layer, and the Ni layer, and the adhesion strength at the interface between the slightly remaining Ni layer and the Ti layer is extremely lowered. As a result, the impact resistance and the heat-cycling resistance at a joint portion after die bonding may be deteriorated. Thus, it is extremely important for die bonding to leave the Ni layer of the back metal.

In the present invention, the present inventors reconsidered the significance of adding each constituent element and searched for the constitution precisely taking into account the balance among constituent elements.

In the present invention, the present inventors have found that when the amount of Ag, Cu, Bi, and Ni are appropriate, the difference between the liquidus temperature and the solidus temperature of the solder alloy (hereinafter, may be referred to as $\Delta T$) falls within an appropriate range.

In the present invention, the present inventors have also studied the miniaturization of intermetallic compounds formed at a joint interface in order to improve the bonding strength of the solder joint.

Since compounds of Cu and Sn are formed at a joint interface, it is necessary that the amount ratio of Cu and Sn is within a predetermined range.

In addition, it is focused on the fact that compounds of Cu and Sn can be miniaturized by substituting a part of Cu with Ni.

Furthermore, since the liquidus temperature of a solder alloy fluctuates greatly depending on the amounts of Cu and Ni, studies have been conducted to control the viscosity at the time of melting while preventing the $\Delta T$ from becoming excessively large and to suppress the growth of Sn compounds.

As a result, it has been found that the well-balanced manner of the amounts of Sn, Cu and Ni in a Sn—Ag—Cu—Bi—Ni—Ge solder alloy allows the $\Delta T$ to be controlled and intermetallic compounds formed at a joint interface to be miniaturized, thereby improving the share strength and the reliability.

Furthermore, in the present invention, the present inventors have found that the adjustment of the amount of Ag to a predetermined range allows to suppress precipitation of coarse $Ag_3Sn$ and to precipitate fine $Ag_3Sn$ at grain boundaries, thereby improving the tensile strength and the reliability.

Furthermore, in the present invention, the present inventors have found that the adjustment of the amount of Bi to a predetermined range allows to impart an appropriate mechanical strength to a solder ball.

Furthermore, the present inventors have found that the addition of an excessive amount of Bi decreases the liquidus temperature, thereby increasing the $\Delta T$ and deteriorating the mechanical strength due to segregation.

Furthermore, the present inventors have found that the adjustment of the amount of Co to a predetermined range reduces the $\Delta T$, makes the tensile strength be 50 MPa or more, and improves the elongation, Poisson's ratio, and coefficient of linear expansion.

In order to solve the above-mentioned problems, the present invention has adopted the following configuration.

[1] A solder alloy which is free from lead and antimony, the solder alloy having an alloy constitution consisting of: 1.0% by mass to 4.0% by mass of Ag; 0.1% by mass to 1.0% by mass of Cu; 0.1% by mass to 9.0% by mass of Bi; 0.005% by mass to 0.3% by mass of Ni; 0.001% by mass to 0.015% by mass of Ge; and a balance of Sn.

[2] The solder alloy according to [1], wherein in the alloy constitution, the amount of Ag is 1.0% by mass to 3.5% by mass.

[3] The solder alloy according to [1] or [2], wherein in the alloy constitution, the amount of Ag is 2.0% by mass to 3.5% by mass.

[4] The solder alloy according to any one of [1] to [3], wherein in the alloy constitution, the amount of Ag is 3.0% by mass to 3.5% by mass.

[5] The solder alloy according to any one of [1] to [4], wherein in the alloy constitution, the amount of Cu is 0.5% by mass to 0.85% by mass.

[6] The solder alloy according to any one of [1] to [5], wherein in the alloy constitution, the amount of Cu is 0.7% by mass to 0.8% by mass.

[7] The solder alloy according to any one of [1] to [6], wherein in the alloy constitution, the amount of Cu is 0.75% by mass to 0.8% by mass.

[8] The solder alloy according to any one of [1] to [7], wherein in the alloy constitution, the amount of Bi is 0.2% by mass to 5.0% by mass.

[9] The solder alloy according to any one of [1] to [8], wherein in the alloy constitution, the amount of Bi is 0.5% by mass to 4.0% by mass.

[10] The solder alloy according to any one of [1] to [9], wherein in the alloy constitution, the amount of Bi is 1.0% by mass to 3.0% by mass.

[11] The solder alloy according to any one of [1] to [10], wherein in the alloy constitution, the amount of Ni is 0.02% by mass to 0.09% by mass.

[12] The solder alloy according to any one of [1] to [11], wherein in the alloy constitution, the amount of Ni is 0.03% by mass to 0.08% by mass.

[13] The solder alloy according to any one of [1] to [12], wherein in the alloy constitution, the amount of Ni is 0.04% by mass to 0.06% by mass.

[14] The solder alloy according to any one of [1] to [13], wherein in the alloy constitution, the amount of Ge is 0.002% by mass to 0.012% by mass.

[15] The solder alloy according to any one of [1] to [14], wherein in the alloy constitution, the amount of Ge is 0.003% by mass to 0.010% by mass.

[16] The solder alloy according to any one of [1] to [15], wherein in the alloy constitution, the amount of Ge is 0.003% by mass to 0.009% by mass.

[17] The solder alloy according to any one of [1] to [16], wherein the alloy constitution satisfies the formula:

$$0.3 \leq Ag/Bi \leq 3.0$$

wherein Ag and Bi indicate each amount thereof (% by mass) in the alloy constitution.

[18] The solder alloy according to any one of [1] to [16], wherein the alloy constitution further includes 0.001% by mass to 0.1% by mass of Co.

[19] The solder alloy according to [18], wherein in the alloy constitution, the amount of Co is 0.002% by mass to 0.015% by mass.

[20] The solder alloy according to or [19], wherein in the alloy constitution, the amount of Co is 0.004% by mass to 0.012% by mass.

[21] The solder alloy according to any one of to [20], wherein in the alloy constitution, the amount of Co is 0.006% by mass to 0.009% by mass.

[22] The solder alloy according to any one of [1] to [17], wherein the alloy constitution satisfies the formula:

$$1<\text{Ag/Bi}$$

wherein Ag and Bi indicate each amount thereof (% by mass) in the alloy constitution.

[23] A solder alloy which is free from lead and antimony, the solder alloy having an alloy constitution consisting of: 3.5% by mass of Ag; 0.8% by mass of Cu; 1.0% by mass to 2.0% by mass of Bi; 0.05% by mass of Ni; by mass of Ge; and a balance of Sn.

[247] A solder alloy which is free from lead and antimony, the solder alloy having an alloy constitution consisting of: 3.0% by mass to 4.0% by mass of Ag; 0.7% by mass to 0.9% by mass of Cu; 1.5% by mass of Bi; by mass to 0.08% by mass of Ni; 0.006% by mass to 0.009% by mass of Ge; and a balance of Sn.

[25] A solder alloy which is free from lead and antimony, the solder alloy having an alloy constitution consisting of: 3.0% by mass to 4.0% by mass of Ag; 0.7% by mass to 0.9% by mass of Cu; 1.8% by mass of Bi; by mass to 0.08% by mass of Ni; 0.006% by mass to 0.009% by mass of Ge; and a balance of Sn.

[26] The solder alloy according to any one of [1] to and to [25], wherein the alloy constitution satisfies the formula:

$$1.2\leq\text{Ag/Bi}\leq3.0$$

wherein Ag and Bi indicate each amount thereof (% by mass) in the alloy constitution.

[27] The solder alloy according to any one of [1] to [17], wherein the alloy constitution satisfies the formula:

$$\text{Ag/Bi}\leq1$$

wherein Ag and Bi indicate each amount thereof (% by mass) in the alloy constitution.

[28] A solder alloy which is free from lead and antimony, the solder alloy having an alloy constitution consisting of: 2.0% by mass of Ag; 0.8% by mass of Cu; 3.0% by mass to 5.0% by mass of Bi; 0.05% by mass of Ni; by mass of Ge; and a balance of Sn.

[29] A solder alloy which is free from lead and antimony, the solder alloy having an alloy constitution consisting of: 1.0% by mass to 3.0% by mass of Ag; 0.7% by mass to 0.9% by mass of Cu; 4.0% by mass of Bi; by mass to 0.08% by mass of Ni; 0.006% by mass to 0.009% by mass of Ge; and a balance of Sn.

[30] The solder alloy according to any one of [1] to and to [29], wherein the alloy constitution satisfies the formula:

$$0.3\leq\text{Ag/Bi}\leq0.7$$

wherein Ag and Bi indicate each amount thereof (% by mass) in the alloy constitution.

[31] A solder alloy which is free from lead and antimony, the solder alloy having an alloy constitution consisting of: 3.5% by mass of Ag; 0.8% by mass of Cu; 0.3% by mass to 0.7% by mass of Bi; 0.05% by mass of Ni; by mass of Ge; 0.008% by mass of Co; and a balance of Sn.

[32] A solder alloy which is free from lead and antimony, the solder alloy having an alloy constitution consisting of: 3.0% by mass to 4.0% by mass of Ag; 0.7% by mass to 0.9% by mass of Cu; 0.5% by mass of Bi; by mass to 0.08% by mass of Ni; 0.006% by mass to 0.009% by mass of Ge; 0.004% by mass to 0.012% by mass of Co; and a balance of Sn.

[33] The solder alloy according to any one of to [21], and [32], wherein the amount of Bi is 0.3% by mass to 1.0% by mass, and the alloy constitution satisfies the formula:

$$5\leq\text{Ag/Bi}\leq15$$

wherein Ag and Bi indicate each amount thereof (% by mass) in the alloy constitution.

[34] A solder alloy which is free from lead and antimony, the solder alloy having an alloy constitution consisting of: 1.0% by mass to 4.0% by mass of Ag; 0.7% by mass to 1.0% by mass of Cu; 0.1% by mass to 7.0% by mass of Bi; 0.040% by mass to 0.095% by mass of Ni; 0.007% by mass to by mass of Ge; and a balance of Sn.

[35] The solder alloy according to [34], wherein the alloy constitution further includes 0.001% by mass to 0.1% by mass of Co.

[36] The solder alloy according to or [35], wherein the alloy constitution satisfies the formula:

$$0.007<\text{Ni}/(\text{Ag}+\text{Bi})<0.017$$

wherein Ni, Ag and Bi indicate each amount thereof (% by mass) in the alloy constitution.

[37] The solder alloy according to any one of to [36], wherein the alloy constitution satisfies the formula:

$$46<(\text{Cu/Ni})\times(\text{Ag}+\text{Bi})<120$$

wherein Cu, Ni, Ag and Bi indicate each amount thereof (% by mass) in the alloy constitution.

[38] A solder ball formed by the solder alloy of any one of [1] to [37].

[39] The solder ball according to [38], wherein an average particle size is 1 μm to 1000 μm.

[40] The solder ball according to [38] or [39], wherein a sphericity is or more.

[41] The solder ball according to any one of [38] to [40], wherein a sphericity is 0.99 or more.

[42] A ball grid array formed by a solder ball of any one of to [41].

[43] A solder joint formed by a solder alloy of any one of [1] to [37].

Effects of the Invention

According to the present invention, it is possible to provide a lead-free and antimony-free solder alloy, solder ball, and solder joint having a melting point of around 230° C. and a tensile strength of 50 MPa or more.

Embodiments for Carrying Out the Invention

The solder alloy according to an embodiment of the present invention has a melting point of around 230° C.

In the solder alloy according to the present embodiment, the main component is Sn having a melting point of 232° C. The melting point of the solder alloy according to the present embodiment is around 230° C. even if elements other than Sn are contained.

Here, the term "melting point" of the solder alloy means the temperature of the solder alloy, which is equal to or higher than the solidus temperature and equal to or lower than the liquidus temperature.

The term "around 230° C." means 170° C. to 230° C.

The phrase "the melting point of the solder alloy is around 230° C." means that "the solidus temperature of the solder alloy is 170° C. to 225° C. and the liquidus temperature of the solder alloy is 210° C. to 230° C.".

1. Constitution of Solder Alloy

A solder alloy according to the present embodiment has an alloy constitution including: 1.0% by mass to 4.0% by mass of Ag; 0.1% by mass to 1.0% by mass of Cu; 0.1% by mass to 9.0% by mass of Bi; 0.005% by mass to 0.3% by mass of Ni; 0.001% by mass to 0.015% by mass of Ge; and a balance of Sn, and is free from lead and antimony.

(1) Ag: 1.0% by Mass to 4.0% by Mass

Ag is an element that improves the strength of the solder alloy by precipitating fine $Ag_3Sn$ at grain boundaries.

The amount of Ag is more preferably 2.0% by mass or more, and even more preferably 3.0% by mass or more.

The amount of Ag is preferably 3.5% by mass or less.

The amount of Ag is 1.0% by mass to 4.0% by mass, preferably 1.0% by mass to 3.5% by mass, more preferably 2.0% by mass to 3.5% by mass, and even more preferably 3.0% by mass to 3.5% by mass.

When the amount of Ag is the above-mentioned lower limit or more, fine Ag 3 Sn can be sufficiently precipitated.

When the amount of Ag is the above-mentioned upper limit or less, the precipitation amount of coarse $Ag_3Sn$ can be reduced.

Alternatively, as another aspect, when the amount of Ag is the lower limit or more, the strength of the joint portion after soldering can be increased.

When the amount of Ag is the above-mentioned upper limit or less, the strength of the joint portion after soldering can be increased.

Furthermore, when the amount of Ag is 3.5% by mass or less, the effect of reducing the precipitation amount of coarse $Ag_3Sn$ can be further enhanced.

(2) Cu: 0.1% by Mass to 1.0% by Mass

Cu is an element that can suppress Cu leaching and improve the precipitation amount of $Cu_6Sn_5$.

The amount of Cu is preferably 0.5% by mass or more, more preferably 0.7% by mass or more, and even more preferably 0.75% by mass or more.

The amount of Cu is preferably 0.85% by mass or less, and more preferably 0.8% by mass or less.

The amount of Cu is 0.1% by mass to 1.0% by mass, preferably 0.5% by mass to 0.85% by mass, more preferably 0.7% by mass to 0.8% by mass, and even more preferably 0.75% by mass to 0.8% by mass.

When the amount of Cu is the above-mentioned lower limit or more, $Cu_6Sn_5$ can be sufficiently precipitated while suppressing Cu leaching, and the precipitation amount of a brittle SnNi compound can be reduced.

When the amount of Cu is the above-mentioned upper limit or less, it is possible to suppress an excessive increase in the liquidus temperature.

Alternatively, as another aspect, the thickness of an intermetallic compound layer at a joint interface can be reduced when the amount of Cu is 0.7% by mass or more.

When the amount of Cu is the above-mentioned upper limit or less, the thickness of an intermetallic compound layer at a joint interface can be reduced.

When the amount of Cu is 0.7% by mass or more, the strength at a joint portion after soldering can be increased.

When the amount of Cu is the above-mentioned upper limit or less, the strength at a joint portion after soldering can be increased.

When the amount of Cu is the above-mentioned upper limit or less, the wettability can be improved.

The amount of Cu is preferably 0.7% by mass to 1.0% by mass, more preferably 0.7% by mass to 0.85% by mass, and even more preferably 0.75% by mass to 0.8% by mass.

(3) Bi: 0.1% by Mass to 9.0% by Mass

The amount of Bi is preferably 0.2% by mass or more, more preferably 0.5% by mass or more, and even more preferably 1.0% by mass or more.

The amount of Bi is preferably 5.0% by mass or less, more preferably 4.0% by mass or less, and even more preferably 3.0% by mass or less.

The amount of Bi is 0.1% by mass to 9.0% by mass, preferably 0.2% by mass to 5.0% by mass, more preferably 0.5% by mass to 4.0% by mass, and even more preferably 1.0% by mass to 3.0% by mass.

When the amount of Bi is the above-mentioned lower limit or more, the mechanical strength optimum for the form of solder balls used as BGA can be obtained, and the creep resistance and the wettability can be improved. Furthermore, because Bi dissolves in Sn, the crystal structure of $(Cu,Ni)_6Sn_5$ is distorted, $Cu_6Sn_5$ can be sufficiently precipitated while suppressing Cu leaching, and the precipitation amount of a brittle SnNi compound can be reduced.

When the amount of Bi is the above-mentioned upper limit or less, it is possible to suppress an excessive decrease in the solidus temperature, thereby decreasing the $\Delta T$. As a result, the segregation of Bi at a joint interface is suppressed, and the decrease in the mechanical strength and the like can be suppressed.

Alternatively, as another aspect, when the amount of Bi is the above-mentioned lower limit or more, the strength at a joint portion after soldering can be increased.

Furthermore, when the amount of Bi is 7.0% by mass or less, the strength at a joint portion after soldering can be increased.

When the amount of Bi is the above-mentioned lower limit or more, the wettability can be improved.

The amount of Bi is preferably 0.1% by mass to 7.0% by mass, more preferably 0.2% by mass to 5% by mass, and even more preferably 0.5% by mass to 4% by mass.

(4) Ni: 0.005% by Mass to 0.3% by Mass

The amount of Ni is preferably 0.02% by mass or more, more preferably 0.03% by mass or more, and even more preferably 0.04% by mass or more.

The amount of Ni is preferably 0.09% by mass or less, more preferably 0.08% by mass or less, and even more preferably 0.06% by mass or less.

The amount of Ni is 0.005% by mass to 0.3% by mass, preferably by mass to 0.09% by mass, more preferably 0.03% by mass to 0.08% by mass, and even more preferably 0.04% by mass to 0.06% by mass.

When the amount of Ni is the above-mentioned lower limit or more, Ni leaching can be suppressed while controlling the liquidus temperature of the solder alloy similarly to Cu.

When the amount of Ni is the above-mentioned upper limit or less, it is possible to suppress an excessive increase in the liquidus temperature.

Alternatively, as another aspect, when the amount of Ni is 0.04% by mass or more, the thickness of an intermetallic compound layer at a joint interface can be reduced. In addition, the strength at a joint portion after soldering can be increased.

Furthermore, when the amount of Ni is 0.095% by mass or less, the thickness of an intermetallic compound layer at a joint interface can be reduced. In addition, the strength at a joint portion after soldering can be increased.

The amount of Ni is preferably 0.04% by mass to 0.095% by mass, more preferably 0.04% by mass to 0.08% by mass, and even more preferably by mass to 0.07% by mass.

(5) Ge: 0.001% by Mass to 0.015% by Mass

The amount of Ge is preferably 0.002% by mass or more, and more preferably 0.003% by mass or more.

The amount of Ge is preferably 0.012% by mass or less, more preferably 0.01% by mass or less, and even more preferably 0.009% by mass or less.

The amount of Ge is 0.001% by mass to 0.015% by mass, preferably by mass to 0.012% by mass, more preferably 0.003% by mass to by mass, and even more preferably 0.003% by mass to 0.009% by mass.

When the amount of Ge is the above-mentioned lower limit or more, the formation of oxidized Sn is suppressed, the crystal structure of the $(Cu, Ni)_6Sn_5$ compound is distorted, the movement of Ni in the compound is suppressed, and the movement of Ni to the solder alloy is hindered, thereby making it possible to suppress Ni leaching.

When the amount of Ge is the above-mentioned upper limit or less, it is possible to suppress an excessive increase in the liquidus temperature.

Alternatively, as another aspect, the discoloration of an alloy can be suppressed when the amount of Ge is 0.007% by mass or more.

When the amount of Ge is the above-mentioned upper limit or less, the wettability can be improved. In addition, the strength at a joint portion after soldering can be increased.

The amount of Ge is preferably 0.007% by mass to 0.015% by mass, more preferably 0.007% by mass to 0.012% by mass, and even more preferably 0.007% by mass to 0.009% by mass.

(6) Co: 0.001% by Mass to 0.1% by Mass

The solder alloy according to the present embodiment may contain Co.

The amount of Co is preferably 0.001% by mass or more, more preferably 0.002% by mass or more, even more preferably 0.004% by mass or more, and particularly preferably 0.006% by mass or more.

The amount of Co is preferably 0.1% by mass or less, more preferably 0.015% by mass or less, even more preferably 0.012% by mass or less, and particularly preferably 0.009% by mass or less.

The amount of Co is preferably 0.001% by mass to 0.1% by mass, more preferably 0.002% by mass to 0.015% by mass, even more preferably by mass to 0.012% by mass, and particularly preferably 0.006% by mass to 0.009% by mass.

When the amount of Co is within the above-mentioned range, the tensile strength can be improved, and the elongation, Poisson's ratio, and coefficient of linear expansion can be improved.

(7) Balance: Sn

The balance of the solder alloy according to the present invention is Sn. In addition to the above-mentioned elements, unavoidable impurities may be contained. Even if unavoidable impurities are contained, it does not affect the above-mentioned effects. Specific examples of the unavoidable impurities include As and Cd. Furthermore, although the present invention is lead-free and antimony-free, it does not exclude the inclusion of Pb and Sb as unavoidable impurities.

(8) Ag/Bi

In the formula of Ag/Bi, Ag and Bi each indicate the amount thereof (% by mass) in the alloy constitution.

When the solder alloy according to the present embodiment does not contain Co, the solder alloy according to the present embodiment preferably satisfies the formula: $0.3 \leq Ag/Bi \leq 3.0$. When the ratio of Ag/Bi is within the above-mentioned range, the tensile strength can be improved.

When the solder alloy according to the present embodiment does not contain Co, it may satisfy the formula: $Ag/Bi \leq 1$. In this case, the tensile strength can be further improved by satisfying the formula: $0.3 \leq Ag/Bi \leq 0.7$.

When the solder alloy according to the present embodiment does not contain Co, it may satisfy the formula: $1 < Ag/Bi$. In this case, the tensile strength can be improved while reducing the $\Delta T$ by satisfying the formula: $1.2 \leq Ag/Bi \leq 3.0$.

When the solder alloy according to the present embodiment contains Co, it is preferable to satisfy the formula: $5 \leq Ag/Bi \leq 15$. When the ratio of Ag/Bi is within the above-mentioned range, $\Delta T$ is reduced, the tensile strength is 50 MPa or more, and the elongation, Poisson's ratio, and coefficient of linear expansion can be improved.

(9) Difference ($\Delta T$) Between Liquidus Temperature and Solidus Temperature In the solder alloy according to the present embodiment, it is preferable that the $\Delta T$ be within a predetermined range in terms that the solid-liquid coexistence region is narrowed, the viscosity increase of a molten solder is suppressed, the segregation of Bi at a joint interface is suppressed, and the decrease in mechanical strength is suppressed.

The solidus temperature of the solder alloy according to the present embodiment is 170° C. to 225° C., preferably 172° C. to 223° C., more preferably 174° C. to 221° C., and even more preferably 176° C. to 219° C.

The liquidus temperature of the solder alloy according to the present embodiment is 210° C. to 230° C., preferably 212° C. to 230° C., more preferably 212° C. to 228° C., and even more preferably 214° C. to 226° C.

The $\Delta T$ is preferably 50° C. or less, more preferably 45° C. or less, even more preferably 40° C. or less, particularly preferably 30° C. or less, and most preferably 15° C. or less. Although the lower limit of the $\Delta T$ is not particularly limited, the lower limit may be 1° C., for example.

(10) Ni/(Ag+Bi)

In the formula, Ni, Ag, and Bi each indicate the amount thereof (% by mass) in the alloy constitution.

The ratio of Ni/(Ag+Bi) is obtained by dividing Ni by the sum of Ag and Bi.

In the solder alloy according to the present embodiment, it is preferable that the ratio of Ni/(Ag+Bi) be more than 0.007. When it satisfies the formula: $0.007 < Ni/(Ag+Bi)$, it is possible to suppress the coarsening of an intermetallic compound and to suppress an excessive decrease in the solidus temperature.

In the solder alloy according to the present embodiment, it is preferable that the ratio of Ni/(Ag+Bi) be less than 0.017. When it satisfies the formula: $Ni/(Ag+Bi) < 0.017$, it is possible to suppress an excessive increase in the liquidus temperature, thereby making the wettability sufficient.

The solder alloy according to the present embodiment preferably satisfies the formula: $0.007 < Ni/(Ag+Bi) < 0.017$.

(11) (Cu/Ni)×(Ag+Bi)

In the formula, Cu, Ni, Ag, and Bi each indicate the amount thereof (% by mass) in the alloy constitution.

The product of (Cu/Ni)×(Ag+Bi) is obtained by dividing Cu by Ni and then multiplying it by the sum of Ag and Bi.

In the solder alloy according to the present embodiment, it is preferable that the product of (Cu/Ni)×(Ag+Bi) be more than 46. When it satisfies the formula: $46 < (Cu/Ni) \times (Ag+Bi)$, it is possible to suppress an excessive increase in the liquidus temperature, thereby making the wettability sufficient.

In the solder alloy according to the present embodiment, it is preferable that the product of (Cu/Ni)×(Ag+Bi) be less than 120. When it satisfies the formula: $(Cu/Ni) \times (Ag+Bi)$ <120, it is possible to suppress an excessive decrease in the solidus temperature while suppressing the coarsening of an intermetallic compound.

The solder alloy according to the present embodiment preferably satisfies the formula: 46<(Cu/Ni)×(Ag+Bi)<120. The solder alloy according to the present embodiment may have a constitution satisfying the formula: 46<(Cu/Ni)×(Ag+Bi)<110, or may have a constitution satisfying the formula: 46<(Cu/Ni)×(Ag+Bi)<100.

The solder alloy according to the above-mentioned embodiment makes it possible to provide a lead-free and antimony-free solder alloy having a melting point of around 230° C. and a tensile strength of 50 MPa or more by having a specific alloy constitution composed of Ag, Cu, Bi, Ni, Ge, and Sn.

Furthermore, the solder alloy according to the above-mentioned embodiment makes it possible to reduce the ΔT by making the amounts of Ag and Bi be within a predetermined range.

In the case of the above-mentioned embodiment in which the solder alloy contains Co, the ΔT can be reduced and the elongation, the Poisson's ratio, and the coefficient of linear expansion of the solder alloy can be improved by adjusting the amount of Co to a predetermined range.

As the solder alloy according to the present embodiment, those of the following first to fifth embodiments can be mentioned.

First Embodiment

A solder alloy of the first embodiment is a lead-free and antimony-free solder alloy having an alloy constitution composed of: 1.0% by mass to 4.0% by mass of Ag; 0.1% by mass to 1.0% by mass of Cu; 0.1% by mass to 9.0% by mass of Bi; 0.005% by mass to 0.3% by mass of Ni; 0.001% by mass to 0.015% by mass of Ge; and a balance of Sn, and satisfying the formula: 1<Ag/Bi.

The amounts of Ag, Cu, Bi, Ni, and Ge may be those described above, respectively.

In the formula, Ag and Bi each indicate the amount thereof (% by mass) in the alloy constitution.

The solder alloy of the first embodiment may be a lead-free and antimony-free solder alloy having an alloy constitution composed of: 3.5% by mass of Ag; 0.8% by mass of Cu; 1.0% by mass to 2.0% by mass of Bi; by mass of Ni; 0.008% by mass of Ge; and a balance of Sn.

The solder alloy of the first embodiment may be a lead-free and antimony-free solder alloy having an alloy constitution composed of: 3.0% by mass to 4.0% by mass of Ag; 0.7% by mass to 0.9% by mass of Cu; 1.5% by mass of Bi; 0.03% by mass to 0.08% by mass of Ni; 0.006% by mass to by mass of Ge; and a balance of Sn.

The solder alloy of the first embodiment may be a lead-free and antimony-free solder alloy having an alloy constitution composed of: 3.0% by mass to 4.0% by mass of Ag; 0.7% by mass to 0.9% by mass of Cu; 1.8% by mass of Bi; 0.03% by mass to 0.08% by mass of Ni; 0.006% by mass to by mass of Ge; and a balance of Sn.

The solder alloy of the first embodiment may be a lead-free and antimony-free solder alloy having an alloy constitution composed of: 3.5% by mass of Ag; 0.8% by mass of Cu; 1.5% by mass to 3.0% by mass of Bi; by mass of Ni; 0.003% by mass of Ge; and a balance of Sn.

The solder alloy of the first embodiment may be a lead-free and antimony-free solder alloy having an alloy constitution composed of: 3.0% by mass to 4.0% by mass of Ag; 0.7% by mass to 0.9% by mass of Cu; 2.0% by mass of Bi; 0.03% by mass to 0.08% by mass of Ni; 0.002% by mass to by mass of Ge; and a balance of Sn.

The solder alloy of the first embodiment may be a lead-free and antimony-free solder alloy having an alloy constitution composed of: 3.0% by mass to 4.0% by mass of Ag; 0.7% by mass to 0.9% by mass of Cu; 2.5% by mass of Bi; 0.03% by mass to 0.08% by mass of Ni; 0.002% by mass to 0.004% by mass of Ge; and a balance of Sn.

The solder alloy of the first embodiment preferably satisfies the formula: 1.2≤Ag/Bi≤3.0, and more preferably satisfies the formula: 1.3≤Ag/Bi≤1.9.

Ag and Bi each indicate the amount thereof (% by mass) in the alloy constitution.

When the ratio of Ag/Bi is within the above-mentioned range, the tensile strength can be improved while reducing the ΔT.

The solder alloy of the first embodiment may be a lead-free and antimony-free solder alloy having an alloy constitution composed of: 3.5% by mass of Ag; 0.8% by mass of Cu; 1.5% by mass of Bi; 0.05% by mass of Ni; 0.008% by mass of Ge; and a balance of Sn.

The solder alloy of the first embodiment may be a lead-free and antimony-free solder alloy having an alloy constitution composed of: 3.5% by mass of Ag; 0.8% by mass of Cu; 1.8% by mass of Bi; 0.05% by mass of Ni; 0.008% by mass of Ge; and a balance of Sn.

The solder alloy of the first embodiment may be a lead-free and antimony-free solder alloy having an alloy constitution composed of: 3.5% by mass of Ag; 0.8% by mass of Cu; 2.0% by mass of Bi; 0.05% by mass of Ni; 0.003% by mass of Ge; and a balance of Sn.

The solder alloy of the first embodiment may be a lead-free and antimony-free solder alloy having an alloy constitution composed of: 3.5% by mass of Ag; 0.8% by mass of Cu; 2.5% by mass of Bi; 0.05% by mass of Ni; 0.003% by mass of Ge; and a balance of Sn.

The solder alloy of the first embodiment makes it possible to provide a lead-free and antimony-free solder alloy having a melting point of around 230° C. and a tensile strength of 50 MPa or more by having a specific alloy constitution composed of Ag, Cu, Bi, Ni, Ge, and Sn.

The solder alloy of the first embodiment can be applied not only to BGA but also to die bonding.

The solder alloy of the first embodiment satisfies the formula: 1<Ag/Bi.

In the solder alloy of the first embodiment, the ΔT can be reduced by making the amounts of Ag and Bi be within a predetermined range.

The solidus temperature of the solder alloy of the first embodiment is preferably 208° C. to 223° C., more preferably 210° C. to 221° C., and even more preferably 212° C. to 219° C.

The liquidus temperature of the solder alloy of the first embodiment is preferably 213° C. to 227° C., more preferably 215° C. to 225° C., and even more preferably 217° C. to 223° C.

The ΔT of the solder alloy of the first embodiment is preferably 10° C. or lower, more preferably 8° C. or lower, and even more preferably 7° C. or lower. Although the lower limit of the ΔT is not particularly limited, the lower limit may be 1° C., for example.

The solder alloy of the first embodiment preferably satisfies the formula: 1.2≤Ag/Bi≤3.0, and more preferably satisfies the formula: 1.3

Ag/Bi≤1.9. When the ratio of Ag/Bi in the solder alloy of the first embodiment is within the above-mentioned range, it becomes easy to reduce the ΔT and to improve the tensile strength.

Alternatively, as another aspect, the solder alloy of the first embodiment preferably satisfies the formula: 1.0≤Ag/Bi≤50.0, more preferably satisfies the formula: 1.0≤Ag/Bi≤3.0, and even more preferably satisfies the formula: 1.5≤Ag/Bi≤3.0. When the ratio of Ag/Bi is within the above-mentioned range in the solder alloy of the first embodiment, it becomes easy to reduce the ΔT and to improve the tensile strength.

Alternatively, as another aspect, the solder alloy of the first embodiment preferably satisfies the formula: 10.0≤Ag/Bi≤50.0, and more preferably satisfies the formula: 20.0≤Ag/Bi≤40.0. When the ratio of Ag/Bi in the solder alloy of the first embodiment is within the above-mentioned range, it becomes easy to reduce the ΔT and to improve the tensile strength.

Second Embodiment

The solder alloy of the second embodiment is a lead-free and antimony-free solder alloy having an alloy constitution composed of: 1.0% by mass to 4.0% by mass of Ag; 0.1% by mass to 1.0% by mass of Cu; 0.1% by mass to 9.0% by mass of Bi; 0.005% by mass to 0.3% by mass of Ni; by mass to 0.015% by mass of Ge; and a balance of Sn, and satisfying the formula: Ag/Bi≤1.

The amounts of Ag, Cu, Bi, Ni, and Ge may be those described above, respectively.

In the formula, Ag and Bi each indicate the amount thereof (% by mass) in the alloy constitution.

The solder alloy of the second embodiment may be a lead-free and antimony-free solder alloy having an alloy constitution composed of: 2.0% by mass of Ag; 0.8% by mass of Cu; 3.0% by mass to 5.0% by mass of Bi; by mass of Ni; 0.008% by mass of Ge; and a balance of Sn.

The solder alloy of the second embodiment may be a lead-free and antimony-free solder alloy having an alloy constitution composed of: 1.0% by mass to 3.0% by mass of Ag; 0.7% by mass to 0.9% by mass of Cu; 4.0% by mass of Bi; 0.04% by mass to 0.08% by mass of Ni; 0.006% by mass to by mass of Ge; and a balance of Sn.

The solder alloy of the second embodiment preferably satisfies the formula: 0.3≤Ag/Bi≤0.7.

Ag and Bi each indicate the amount thereof (% by mass) in the alloy constitution.

When the ratio of Ag/Bi is within the above-mentioned range, the tensile strength can be further improved.

The solder alloy of the second embodiment is preferably a lead-free and antimony-free solder alloy having an alloy constitution composed of: 2.0% by mass of Ag; 0.8% by mass of Cu; 4.0% by mass of Bi; 0.05% by mass of Ni; 0.008% by mass of Ge; and a balance of Sn.

The solder alloy of the second embodiment makes it possible to provide a lead-free and antimony-free solder alloy having a melting point of around 230° C. and a tensile strength of 50 MPa or more by having a specific alloy constitution composed of Ag, Cu, Bi, Ni, Ge, and Sn.

The solder alloy of the second embodiment can be applied not only to BGA but also to die bonding.

The solder alloy of the second embodiment satisfies the formula: Ag/Bi≤1.

The solder alloy of the second embodiment makes it possible to reduce the ΔT by making the amounts of Ag and Bi be within a predetermined range.

The solidus temperature of the solder alloy of the second embodiment is preferably 175° C. to 220° C., more preferably 175° C. to 218° C., and even more preferably 176° C. to 216° C.

The liquidus temperature of the solder alloy of the second embodiment is 210° C. to 230° C., preferably 211° C. to 229° C., and more preferably 213° C. to 227° C.

The ΔT of the solder alloy of the second embodiment is preferably or lower, more preferably 45° C. or lower, and even more preferably or lower. Although the lower limit of the ΔT is not particularly limited, the lower limit may be 1° C., for example.

The solder alloy of the second embodiment preferably satisfies the formula: 0.3≤Ag/Bi≤0.7. When the ratio of Ag/Bi in the solder alloy of the second embodiment is within the above-mentioned range, it becomes easy to reduce the ΔT and to improve the tensile strength.

Alternatively, as another aspect, the solder alloy of the second embodiment preferably satisfies the formula: 0.1≤Ag/Bi≤0.8, more preferably satisfies the formula: 0.15≤Ag/Bi≤0.7, and even more preferably satisfies the formula: 0.2≤Ag/Bi≤0.6. When the ratio of Ag/Bi in the solder alloy of the second embodiment is within the above-mentioned range, it becomes easy to reduce the ΔT and to improve the tensile strength.

The solder alloy of the first embodiment can suppress a decrease in the solidus temperature in comparison with the solder alloy of the second embodiment.

The solder alloy of the first embodiment can reduce the ΔT in comparison with the solder alloy of the second embodiment.

The solder alloy of the second embodiment can improve the tensile strength in comparison with the solder alloy of the first embodiment.

Third Embodiment

The solder alloy of the third embodiment is a lead-free and antimony-free solder alloy having an alloy constitution composed of: 1.0% by mass to 4.0% by mass of Ag; 0.1% by mass to 1.0% by mass of Cu; 0.1% by mass to 9.0% by mass of Bi; 0.005% by mass to 0.3% by mass of Ni; 0.001% by mass to 0.015% by mass of Ge; 0.001% by mass to 0.1% by mass of Co; and a balance of Sn.

The amounts of Ag, Cu, Bi, Ni, Ge, and Co may be those described above, respectively.

The solder alloy of the third embodiment may be a lead-free and antimony-free solder alloy having an alloy constitution composed of: 3.5% by mass of Ag; 0.8% by mass of Cu; 0.3% by mass to 0.7% by mass of Bi; by mass of Ni; 0.008% by mass of Ge; 0.008% by mass of Co; and a balance of Sn.

The solder alloy of the third embodiment may be a lead-free and antimony-free solder alloy having an alloy constitution composed of: 3.0% by mass to 4.0% by mass of Ag; 0.7% by mass to 0.9% by mass of Cu; 0.5% by mass of Bi; 0.03% by mass to 0.08% by mass of Ni; 0.006% by mass to by mass of Ge; 0.004% by mass to 0.012% by mass of Co; and a balance of Sn.

It is preferable in the solder alloy of the third embodiment that the amount of Bi be 0.3% by mass to 1.0% by mass, and the formula: 5≤Ag/Bi≤15 be satisfied.

Ag and Bi each indicate the amount thereof (% by mass) in the alloy constitution.

By adjusting the ratio of Ag/Bi to the above-mentioned range and the amount of Co to a predetermined range, the ΔT can be reduced and the tensile strength, elongation, Poisson's ratio, and coefficient of linear expansion can be improved.

The solder alloy of the third embodiment is preferably a lead-free and antimony-free solder alloy having an alloy constitution composed of: 3.5% by mass of Ag; 0.8% by mass of Cu; 0.5% by mass of Bi; 0.05% by mass of Ni; 0.008% by mass of Ge; 0.008% by mass of Co; and a balance of Sn.

In the solder alloy of the third embodiment, the amount of Co is by mass to 0.1% by mass.

The solder alloy of the third embodiment makes it possible to provide a lead-free and antimony-free solder alloy having a melting point of around 230° C. and a tensile strength of 50 MPa or more by having a specific alloy constitution composed of Ag, Cu, Bi, Ni, Ge, Co, and Sn.

The solder alloy of the third embodiment can be applied not only to BGA but also to die bonding.

The solidus temperature of the solder alloy of the third embodiment is preferably 212° C. to 222° C., more preferably 214° C. to 220° C., and even more preferably 216° C. to 218° C.

The liquidus temperature of the solder alloy of the third embodiment is preferably 216° C. to 226° C., more preferably 218° C. to 224° C., and even more preferably 220° C. to 222° C.

The $\Delta T$ of the solder alloy of the third embodiment is preferably or lower, more preferably 8° C. or lower, and even more preferably 7° C. or lower. Although the lower limit of the $\Delta T$ is not particularly limited, the lower limit may be 1° C., for example.

The solder alloy of the third embodiment preferably satisfies the formula: $5 \leq Ag/Bi \leq 15$. When the ratio of Ag/Bi in the solder alloy of the third embodiment is within the above-mentioned range, it becomes easy to reduce the $\Delta T$ and to improve the tensile strength. In addition, when the ratio of Ag/Bi in the solder alloy of the third embodiment is within the above-mentioned range, the elongation, Poisson's ratio, and coefficient of linear expansion can be improved.

Alternatively, as another aspect, the solder alloy of the third embodiment preferably satisfies the formula: $0.2 \leq Ag/Bi \leq 15.0$, more preferably satisfies the formula: $0.3 \leq Ag/Bi \leq 3.0$, even more preferably satisfies the formula: $0.5 \leq Ag/Bi \leq 2.0$, and particularly preferably satisfies the formula: $0.6 \leq Ag/Bi \leq 1.0$. When the ratio of Ag/Bi in the solder alloy of the third embodiment is within the above-mentioned range, it becomes easy to reduce the $\Delta T$ and to improve the tensile strength.

The solidus temperature of the solder alloy of the third embodiment is preferably 200° C. to 223° C., more preferably 202° C. to 221° C., and even more preferably 204° C. to 219° C.

The liquidus temperature of the solder alloy of the third embodiment is preferably 210° C. to 227° C., more preferably 211° C. to 225° C., and even more preferably 213° C. to 223° C.

The $\Delta T$ of the solder alloy of the third embodiment is preferably 30° C. or lower, more preferably 20° C. or lower, and even more preferably 15° C. or lower. Although the lower limit of the $\Delta T$ is not particularly limited, the lower limit may be 1° C., for example.

Fourth Embodiment

The solder alloy of the fourth embodiment is a lead-free and antimony-free solder alloy having an alloy constitution composed of: 1.0% by mass to 4.0% by mass of Ag; 0.7% by mass to 1.0% by mass of Cu; 0.1% by mass to 7.0% by mass of Bi; 0.040% by mass to 0.095% by mass of Ni; 0.007% by mass to 0.015% by mass of Ge; and a balance of Sn.

The amounts of Ag, Cu, Bi, Ni, and Ge may be those described above, respectively.

The solder alloy of the fourth embodiment may be a lead-free and antimony-free solder alloy having an alloy constitution composed of: 3.0% by mass to 3.5% by mass of Ag; 0.7% by mass to 1.0% by mass of Cu; 1.0% by mass to 2.0% by mass of Bi; 0.040% by mass to 0.060% by mass of Ni; by mass to 0.010% by mass of Ge; and a balance of Sn.

Alternatively, the solder alloy of the fourth embodiment may be a lead-free and antimony-free solder alloy having an alloy constitution composed of: 1.5% by mass to 2.5% by mass of Ag; 0.7% by mass to 1.0% by mass of Cu; 3.0% by mass to 5.0% by mass of Bi; 0.060% by mass to by mass of Ni; 0.007% by mass to 0.010% by mass of Ge; and a balance of Sn.

The solder alloy of the fourth embodiment makes it possible to provide a lead-free and antimony-free solder alloy having a melting point of around 230° C. and a tensile strength of 50 MPa or more by having a specific alloy constitution composed of Ag, Cu, Bi, Ni, Ge, and Sn.

The solder alloy of the fourth embodiment may be applied not only to BGA but also to die bonding.

The solder alloy of the fourth embodiment preferably satisfies the formula: $0.3 \leq Ag/Bi \leq 3.0$, more preferably satisfies the formula: $1.2 \leq Ag/Bi \leq 3.0$, and even more preferably satisfies the formula: $1.3 \leq Ag/Bi \leq 1.9$.

When the ratio of Ag/Bi in the solder alloy of the fourth embodiment is within the above-mentioned range, it becomes easy to reduce the $\Delta T$ and to improve the tensile strength.

Alternatively, the solder alloy of the fourth embodiment preferably satisfies the formula: $0.3 \leq Ag/Bi \leq 3.0$, and more preferably satisfies the formula: $0.3 \leq Ag/Bi \leq 0.7$.

When the ratio of Ag/Bi in the solder alloy of the fourth embodiment is within the above-mentioned range, it becomes easy to reduce the $\Delta T$ and to improve the tensile strength.

The solder alloy of the fourth embodiment further exhibits the following effects.

The solder alloy of the fourth embodiment can reduce the thickness of an intermetallic compound layer at a joint interface.

Furthermore, the solder alloy of the fourth embodiment can sufficiently precipitate fine $Ag_3Sn$, and can reduce the precipitation amount of coarse Ag 3 Sn.

Furthermore, the solder alloy of the fourth embodiment can suppress discoloration of the alloy.

Further, the solder alloy of the fourth embodiment can increase the strength at a joint portion after soldering.

In the solder alloy of the fourth embodiment, the ratio of Ni/(Ag+Bi) preferably exceeds 0.007. When the solder alloy satisfies the formula: $0.007 < Ni/(Ag+Bi)$, it is possible to suppress the coarsening of an intermetallic compound and to suppress an excessive decrease in the solidus temperature.

In the solder alloy of the fourth embodiment, the ratio of Ni/(Ag+Bi) is preferably less than 0.017. When the solder alloy satisfies the formula: $Ni/(Ag+Bi) < 0.017$, it is possible to suppress an excessive increase in the liquidus temperature, thereby making the wettability sufficient.

It is preferable in the solder alloy of the fourth embodiment that the formula: $0.007 < Ni/(Ag+Bi) < 0.017$ be satisfied.

Ni, Ag, and Bi each indicate the amount thereof (% by mass) in the alloy constitution.

In the solder alloy of the fourth embodiment, the product of (Cu/Ni)×(Ag+Bi) preferably exceeds 46. When the solder alloy satisfies the formula: 46<(Cu/Ni)×(Ag+Bi), it is possible to suppress an excessive increase in the liquidus temperature, thereby making the wettability sufficient.

In the solder alloy of the fourth embodiment, the product of (Cu/Ni)×(Ag+Bi) is preferably less than 120. When the solder alloy satisfies the formula: (Cu/Ni)×(Ag+Bi)<120, it is possible to suppress the coarsening of an intermetallic compound and to suppress an excessive decrease in the solidus temperature.

The solder alloy of the fourth embodiment preferably satisfies the formula: 46<(Cu/Ni)×(Ag+Bi)<120. The solder alloy of the fourth embodiment may have a constitution satisfying the formula: 46<(Cu/Ni)×(Ag+Bi)<110, or may have a constitution satisfying the formula: 46<(Cu/Ni)× (Ag+Bi)<100.

The solder alloy of the fourth embodiment preferably satisfies the formula: 1.0≤Ag/Bi≤50.0, more preferably satisfies the formula: 1.0≤Ag/Bi≤3.0, and even more preferably satisfies the formula: 1.5≤Ag/Bi≤3.0. When the ratio of Ag/Bi in the solder alloy of the fourth embodiment is within the above-mentioned range, it becomes easy to reduce the ΔT and to improve the tensile strength.

Alternatively, as another aspect, the solder alloy of the fourth embodiment preferably satisfies the formula: 10.0≤Ag/Bi≤50.0, and more preferably satisfies the formula: 20.0≤Ag/Bi≤40.0. When the ratio of Ag/Bi in the solder alloy of the fourth embodiment is within the above-mentioned range, it becomes easy to reduce the ΔT and to improve the tensile strength.

Alternatively, the solder alloy of the fourth embodiment preferably satisfies the formula: 0.1≤Ag/Bi≤0.8, more preferably satisfies the formula: 0.15≤Ag/Bi≤0.7, and even more preferably satisfies the formula: 0.2≤Ag/Bi≤0.6. When the ratio of Ag/Bi in the solder alloy of the fourth embodiment is within the above-mentioned range, it becomes easy to reduce the ΔT and to improve the tensile strength.

The solidus temperature of the solder alloy of the fourth embodiment is 170° C. to 225° C., preferably 172° C. to 223° C., more preferably 174° C. to 221° C., and even more preferably 176° C. to 219° C.

The liquidus temperature of the solder alloy of the fourth embodiment is 210° C. to 230° C., preferably 212° C. to 230° C., more preferably 212° C. to 228° C., and even more preferably 214° C. to 226° C.

The ΔT is preferably 50° C. or lower, more preferably 45° C. or lower, and even more preferably 40° C. or lower. Although the lower limit of the ΔT is not particularly limited, the lower limit may be 1° C., for example.

Fifth Embodiment

The solder alloy of the fifth embodiment is a lead-free and antimony-free solder alloy having an alloy constitution composed of: 1.0% by mass to 4.0% by mass of Ag; 0.7% by mass to 1.0% by mass of Cu; 0.1% by mass to 7.0% by mass of Bi; 0.040% by mass to 0.095% by mass of Ni; 0.007% by mass to 0.015% by mass of Ge; 0.001% by mass to 0.1% by mass of Co; and a balance of Sn.

The amounts of Ag, Cu, Bi, Ni, Ge, and Co may be those described above, respectively.

The solder alloy of the fifth embodiment may be a lead-free and antimony-free solder alloy having an alloy constitution composed of: 3.0% by mass to 3.5% by mass of Ag; 0.7% by mass to 1.0% by mass of Cu; 0.3% by mass to 0.7% by mass of Bi; 0.040% by mass to 0.060% by mass of Ni; 0.007% by mass to 0.010% by mass of Ge; 0.005% by mass to 0.010% by mass of Co; and a balance of Sn.

The solder alloy of the fifth embodiment makes it possible to provide a lead-free and antimony-free solder alloy having a melting point of around 230° C. and a tensile strength of 50 MPa or more by having a specific alloy constitution composed of Ag, Cu, Bi, Ni, Ge, Co, and Sn.

The solder alloy of the fifth embodiment may be applied not only to BGA but also to die bonding.

The solder alloy of the fifth embodiment can improve the elongation, Poisson's ratio, and coefficient of linear expansion.

The solder alloy of the fifth embodiment preferably satisfies the formula: 5≤Ag/Bi≤15.

When the ratio of Ag/Bi in the solder alloy of the fifth embodiment is within the above-mentioned range, it becomes easy to reduce the ΔT and to improve the tensile strength. In addition, it also becomes easy to improve the elongation, Poisson's ratio, and coefficient of linear expansion.

The solder alloy of the fifth embodiment further exhibits the following effects.

The solder alloy of the fifth embodiment can reduce the thickness of an intermetallic compound layer at a joint interface.

In addition, the solder alloy of the fifth embodiment can sufficiently precipitate fine Ag₃Sn, and can reduce the precipitation amount of coarse Ag₃Sn.

Furthermore, the solder alloy of the fifth embodiment can suppress discoloration of the alloy.

Furthermore, the solder alloy of the fifth embodiment can increase the strength at a joint portion after soldering.

In the solder alloy of the fifth embodiment, the ratio of Ni/(Ag+Bi) preferably exceeds 0.007. When the solder alloy satisfies the formula: 0.007<Ni/(Ag+Bi), it is possible to suppress the coarsening of an intermetallic compound and to suppress an excessive decrease in the solidus temperature.

In the solder alloy of the fifth embodiment, the ratio of Ni/(Ag+Bi) is preferably less than 0.017. When the solder alloy satisfies the formula: Ni/(Ag+Bi)<0.017, it is possible to suppress an excessive increase in the liquidus temperature, thereby making the wettability sufficient.

The solder alloy of the fifth embodiment preferably satisfies the formula: 0.007<Ni/(Ag+Bi)<0.017.

Ni, Ag, and Bi each indicate the amount thereof (% by mass) in the alloy constitution.

In the solder alloy of the fifth embodiment, the product of (Cu/Ni)×(Ag+Bi) preferably exceeds 46. When the solder alloy satisfies the formula: 46<(Cu/Ni)×(Ag+Bi), it is possible to suppress an excessive increase in the liquidus temperature, thereby making the wettability sufficient.

In the solder alloy of the fifth embodiment, the product of (Cu/Ni)×(Ag+Bi) is preferably less than 120. When the solder alloy satisfies the formula: (Cu/Ni)×(Ag+Bi)<120, it is possible to suppress the coarsening of an intermetallic compound and to suppress an excessive decrease in the solidus temperature.

The solder alloy of the fifth embodiment preferably satisfies the formula: 46<(Cu/Ni)×(Ag+Bi)<120. The solder alloy of the fifth embodiment may have a constitution satisfying the formula: 46<(Cu/Ni)×(Ag+Bi)<110, or may have a constitution satisfying the formula: 46<(Cu/Ni)× (Ag+Bi)<100.

The solder alloy of the fifth embodiment preferably satisfies the formula: 0.2≤≤Ag/Bi≤15.0, and more preferably satisfies the formula: $5 \leq Ag/Bi \leq 15$. When the ratio of Ag/Bi in the solder alloy of the fifth embodiment is within the above-mentioned range, it becomes easy to reduce the $\Delta T$ and to improve the tensile strength. In addition, when the ratio of Ag/Bi in the solder alloy of the fifth embodiment is within the above-mentioned range, the elongation, Poisson's ratio, and coefficient of linear expansion can be improved.

Alternatively, the solder alloy of the fifth embodiment preferably satisfies the formula: $0.2 \leq Ag/Bi \leq 15.0$, more preferably satisfies the formula: $0.3 \leq Ag/Bi \leq 3.0$, even more preferably satisfies the formula: $0.5$ $Ag/Bi \leq 2.0$, and particularly preferably satisfies the formula: $0.6 \leq Ag/Bi$ 1.0. When the ratio of Ag/Bi in the solder alloy of the fifth embodiment is within the above-mentioned range, it becomes easy to reduce the $\Delta T$ and to improve the tensile strength.

The solidus temperature of the solder alloy of the fifth embodiment is preferably 200° C. to 223° C., more preferably 202° C. to 221° C., and even more preferably 204° C. to 219° C.

The liquidus temperature of the solder alloy of the fifth embodiment is preferably 210° C. to 227° C., more preferably 211° C. to 225° C., and even more preferably 213° C. to 223° C.

The $\Delta T$ of the solder alloy of the fifth embodiment is preferably 30° C. or lower, more preferably 20° C. or lower, and even more preferably 15° C. or lower. Although the lower limit of the $\Delta T$ is not particularly limited, the lower limit may be 1° C., for example.

2. Solder Ball

The lead-free and antimony-free solder alloys of the above-mentioned embodiments described above are suitable to be in the form of solder balls used in BGA.

The sphericity of the solder ball of the present embodiment is preferably 0.90 or more, more preferably 0.95 or more, and most preferably 0.99 or more.

The sphericity is determined by various methods such as the least squares circle method (LSC method), the minimum zone circle method (MZC method), the maximum inscribed circle method (MIC method), or the minimum circumscribed circle method (MCC method).

In the present invention, the sphericity of the solder ball is measured using a CNC image measuring system (Ultra Quick Vision ULTRA QV350-PRO measuring device manufactured by Mitutoyo Co., Ltd.) in accordance with the minimum zone circle method (MZC method).

In the present invention, the sphericity represents a deviation from a true sphere, and for example, the sphericity is an arithmetic mean value calculated when the diameter of each of 500 balls is divided by the major axis. The closer the value of the sphericity is to the upper limit of 1.00, the closer it is to a true sphere.

The solder balls according to the present embodiment are used to form bumps on electrodes and substrates of semiconductor packages such as BGA (ball grid array).

The diameter of the solder ball according to the present embodiment is preferably within the range of 1 μm to 1000 μm, and more preferably 50 μm to 300 μm.

The solder ball can be prepared by a general preparation method of a solder ball.

The diameter in the present embodiment means the diameter measured using an Ultra Quick Vision ULTRA QV350-PRO measuring device manufactured by Mitutoyo Co., Ltd.

3. Solder Joint

A solder joint according to the present invention is suitable to be used to connect an IC chip on a semiconductor package with a substrate (interposer) thereof, or to connect a semiconductor package with a printed wiring board.

Here, the term "solder joint" refers to a connection part connecting an IC chip and a substrate using the above-mentioned solder alloy according to the present invention, and encompasses a connection part of an electrode and a connection part between a die and a substrate.

4. Other

A bonding method using the solder alloy according to the above-mentioned embodiment may be performed by an ordinary method using a reflow method. The heating temperature may be appropriately adjusted depending on the heat resistance of a chip or on the liquidus temperature of the solder alloy. The heating temperature is preferably about 240° C. from the viewpoint of suppressing thermal damage to a chip. The melting temperature of the solder alloy when flow soldering is conducted may be approximately 20° C. higher than the liquidus temperature.

In a case where bonding is conducted using the solder alloy according to the present embodiment, the structure can be further miniaturized by considering a cooling rate during solidification. For example, the solder joint is cooled at a cooling rate of 2° C./s to 3° C./s or higher. Other bonding conditions can be appropriately adjusted depending on the alloy constitution of the solder alloy.

The solder alloy according to the present invention enables a low α-ray alloy to be produced by using a low α-ray material as a raw material thereof. When such a low α-ray-alloy is used to form solder bumps in the periphery of a memory, soft errors can be suppressed.

EXAMPLES

Hereinafter, the present invention will be described with reference to examples, but the present invention is not limited to the following examples.

Solder alloys of Examples 1 to 4 were synthesized with the constitution shown below.

Each solder alloy was measured by the method shown below.

(1) Measurement of Solidus Temperature and Liquidus Temperature

The solidus temperature and the liquidus temperature were measured using a differential scanning calorimetry (DSC) method using a thermomechanical analyzer (EXSTAR 6000, Seiko Instruments Inc.).

The solidus temperature was measured by a method in accordance with JIS Z3198-1.

The liquidus temperature was measured by a DSC method similar to the method of measuring the solidus temperature in accordance with JIS Z3198-1.

(2) Measurement of Tensile Strength and Elongation

Tensile strength and elongation were determined by subjecting a test piece, the parallel portion of which was 30 mm and the diameter of which was 8 mm, to a tensile test using a universal material testing machine (Instron: 5966).

(3) Poisson's Ratio

Poisson's ratio of a cubic test piece having a side of 15 mm was measured using a sing around type sound velocity measuring device (ULTRASONIC ENGINEERING CO., Ltd.: UVM-2).

(4) Coefficient of Linear Expansion

The coefficient of linear expansion of a test piece having a diameter of 8 mm and a length of 15 mm was measured using a thermomechanical analyzer (EXSTAR 6000, Seiko Instruments Inc.).

Example 1

A solder alloy having an alloy constitution consisting of: 3.5% by mass of Ag; 0.8% by mass of Cu; 1.5% by mass of Bi; 0.05% by mass of Ni; by mass of Ge; and a balance of Sn was prepared.

The solder alloy of Example 1 had a solidus temperature of 214° C., a liquidus temperature of 219° C., and a ΔT of 5° C.

The solder alloy of Example 1 had a tensile strength of 66.2 MPa.

Example 2

A solder alloy having an alloy constitution consisting of: 3.5% by mass of Ag; 0.8% by mass of Cu; 1.8% by mass of Bi; 0.05% by mass of Ni; by mass of Ge; and a balance of Sn was prepared.

The solder alloy of Example 2 had a solidus temperature of 213° C., a liquidus temperature of 218° C., and a ΔT of 5° C.

The solder alloy of Example 2 had a tensile strength of 69.9 MPa.

Example 3

A solder alloy having an alloy constitution consisting of: 2.0% by mass of Ag; 0.75% by mass of Cu; 4.0% by mass of Bi; 0.07% by mass of Ni; 0.008% by mass of Ge; and a balance of Sn was prepared.

The solder alloy of Example 3 had a solidus temperature of 206° C., a liquidus temperature of 219° C., and a ΔT of 13° C.

The solder alloy of Example 3 had a tensile strength of 83.8 MPa.

Example 4

A solder alloy having an alloy constitution consisting of: 3.5% by mass of Ag; 0.8% by mass of Cu; 0.5% by mass of Bi; 0.05% by mass of Ni; 0.008% by mass of Ge; 0.008% by mass of Co; and a balance of Sn was prepared.

The solder alloy of Example 4 had a solidus temperature of 217° C., a liquidus temperature of 221° C., and a ΔT of 4° C.

The solder alloy of Example 4 had a tensile strength of 55.5 MPa.

The solder alloy of Example 4 had an elongation of 33%.

The solder alloy of Example 4 had a Poisson's ratio of 0.35.

The solder alloy of Example 4 had a coefficient of linear expansion of 21.5 ppm/K.

Example 5

A solder alloy having an alloy constitution consisting of: 3.5% by mass of Ag; 0.8% by mass of Cu; 2.0% by mass of Bi; 0.05% by mass of Ni; 0.003% by mass of Ge; and a balance of Sn was prepared.

The solder alloy of Example 5 had a solidus temperature of 212° C., a liquidus temperature of 218° C., and a ΔT of 6° C.

The solder alloy of Example 5 had a tensile strength of 72.3 MPa.

Example 6

A solder alloy having an alloy constitution consisting of: 3.5% by mass of Ag; 0.8% by mass of Cu; 2.5% by mass of Bi; 0.05% by mass of Ni; 0.003% by mass of Ge; and a balance of Sn was prepared.

The solder alloy of Example 6 had a solidus temperature of 211° C., a liquidus temperature of 216° C., and a ΔT of 5° C.

The solder alloy of Example 6 had a tensile strength of 78.0 MPa.

<Preparation of Solder Alloy Powder>

Test Examples A1 to A15 and B1 to B16

Solder alloy powders of each test example, the constitution of which is shown in the following Tables 1 to 5, were prepared.

The solder alloy powders had a size (particle size distribution) that satisfied symbol 6 in a powder size classification (Table 2) of JIS Z 3284-1: 2014. In the solder alloy powders, the mass fraction of powders having a particle size of 5 μm to 15 μm was 80% or more with respect to the total mass (100%) of the solder alloy powders.

Test Examples A1 to A12 and A14 corresponded to the fourth embodiment.

Test Examples A13 and A15 corresponded to the fifth embodiment.

Test Examples B1 to B16 corresponded to neither the fourth nor fifth embodiment.

Test Examples B3, B5, B6, B8, B9, and B11 to B16 were within the scope of the present invention.

Test Examples B1, B2, B4, B7, and B10 were outside the scope of the present invention.

The solder alloy powders prepared above were subjected to <<evaluation of thickness of intermetallic compound (IMC) layer>>, <<evaluation of size of $Ag_3Sn$>>, <<evaluation of discoloration resistance>>, <<evaluation of wettability>>, and <<evaluation of strength of solder joint portion>> in accordance with evaluation methods described below in <Evaluation>. The results are shown in Tables 1 and 2.

<Evaluation>

<<Evaluation of Thickness of Intermetallic Compound (IMC) Layer>>

A solder ball having a diameter of 0.3 mm was prepared using the solder alloy powder of each example.

A flux (manufactured by Senju Metal Industry Co., Ltd., WF-6400) was applied to a module substrate of CSP (S/F: electrolytic Ni/Au, size 12×12 mm), and then the solder ball was mounted thereon.

Then, reflow soldering (220° C. or higher, 40 seconds, peak temperature 245° C.) was performed. As a result, a CSP equipped with a solder ball electrode was obtained.

Furthermore, an electrode pattern (S/F: Cu—OSP) was printed on a glass epoxy substrate (FR-4, size 30 mm×120 mm, thickness 0.8 mm) using a solder paste. The solder alloy powder contained in the solder paste was composed of a solder alloy consisting of: 3% by mass of Ag; 0.5% by mass of Cu; and a balance was Sn.

Then, an evaluation substrate was prepared by performing reflow soldering (220° C. or higher, 40 seconds, peak temperature 245° C.) using the above-mentioned CSP equipped with the solder ball electrode and the printed glass epoxy substrate.

The evaluation substrate after soldering was subjected to cross-sectional observation using a field emission scanning electron microscope (manufactured by JEOL Ltd.: JSM-7000F). The observation point was IMC at a joint interface on the CSP side. The thickness of IMC was measured by an image processing software (manufactured by Olympus Corporation: Scandium).

Evaluation results of Test Examples A1 to A15 and B1 to B16 are shown in Tables 1 and 2.

Evaluation Criteria:

A: The thickness of IMC layer was less than 1.4 μm.

B: The thickness of IMC layer was 1.4 μm or more.

<<Evaluation of size of $Ag_3Sn$>>

A solder ball having a diameter of 0.3 mm was prepared using the solder alloy powders of each test example.

A flux (manufactured by Senju Metal Industry Co., Ltd.: WF-6317) was applied on an electrode (S/F: Cu—OSP), and then the resultant solder ball was mounted thereon.

Reflow soldering (peak temperature 245° C., cooling rate 2° C./s) was performed using a reflow device (manufactured by Senju Metal Industry Co., Ltd.: SNR-615).

The soldered sample was subjected to cross-sectional observation using a field emission scanning electron microscope (manufactured by JEOL Ltd.: JSM-7000F).

The evaluation results of Test Examples A1 to A15 and B1 to B16 are shown in Tables 1 and 2.

Evaluation Criteria:

A: The maximum length of Ag 3 Sn was less than 5 μm.

B: The maximum length of Ag 3 Sn was 5 μm to less than 90 μm.

C: The maximum length of Ag 3 Sn was 90 μm or more.

<<Evaluation of Discoloration Resistance>>

A solder ball having a diameter of 0.3 mm was prepared using the solder alloy powder of each test example.

The solder ball was left still in a highly accelerated stress test device (HAST chamber, ESPEC CORP.: EHS-211M).

The device was set at 125° C./100% RH, and after 4 hours, the presence or absence of discoloration of the solder ball was visually confirmed.

The evaluation results of Test Examples A1 to A15 and B1 to B16 are shown in Tables 1 and 2.

Evaluation Criteria:

A: The solder ball was not discolored.

B: The solder ball was discolored.

<<Evaluation of Wettability>>

A solder ball having a diameter of 0.3 mm was prepared using the solder alloy powder of each test example.

A flux (manufactured by Senju Metal Industry Co., Ltd.: WF-6317) was applied to a substrate (S/F: Cu—OSP), and then the resultant solder ball was mounted thereon.

Then, reflow soldering (220° C. or higher, 40 seconds, peak temperature 245° C.) was performed.

After reflow, the length of wet spread was measured using a digital microscope (manufactured by KEYENCE CORPORATION: VHX-6000).

The evaluation results of Test Examples A1 to A15 and B1 to B16 are shown in Tables 1 and 2.

Evaluation Criteria:

A: The wet spread length was 1000 μm or more.

B: The wet spread length was less than 1000 μm.

<<Evaluation of Strength of Solder Joint Portions>>

A solder ball having a diameter of 0.76 mm was prepared using the solder alloy powder of each example.

A flux (manufactured by Senju Metal Industry Co., Ltd.: WF-6400) was applied to a substrate treated with an electrolytic Ni/Au, and then a solder ball was mounted thereon.

Then, reflow soldering (220° C. or higher, 40 seconds, peak temperature 245° C.) was performed.

The soldered sample was tested at a test speed of 1000 μm/s using a pull tester (manufactured by Nordson Advanced Technology K.K.: Dage 400011S). The test number was N=20.

The evaluation results of Test Examples A1 to A15 and B1 to B16 are shown in Tables 1 and 2.

Evaluation Criteria:

A: The ratio of the number of tests in which an IMC layer was destroyed relative to the total number of tests was 50% or less.

B: The ratio of the number of tests in which an IMC layer was destroyed relative to the total number of tests was more than 50%.

TABLE 1

| | Sn | Ag | Cu | Ni | Bi | Ge | Co | Ag/Bi | Formula (1) | Formula (2) |
|---|---|---|---|---|---|---|---|---|---|---|
| T. Ex. A1 | Bal. | 1.0 | 0.80 | 0.050 | 2.00 | 0.0080 | | 0.50 | 0.0167 | 48.0 |
| T. Ex. A2 | Bal. | 4.0 | 0.80 | 0.050 | 1.50 | 0.0080 | | 2.67 | 0.0091 | 88.0 |
| T. Ex. A3 | Bal. | 3.5 | 0.70 | 0.050 | 1.50 | 0.0080 | | 2.33 | 0.0100 | 70.0 |
| T. Ex. A4 | Bal. | 3.0 | 1.00 | 0.050 | 1.50 | 0.0080 | | 2.00 | 0.0111 | 90.0 |
| T. Ex. A5 | Bal. | 3.0 | 0.80 | 0.040 | 1.50 | 0.0080 | | 2.00 | 0.0089 | 90.0 |
| T. Ex. A6 | Bal. | 2.0 | 0.75 | 0.095 | 4.00 | 0.0080 | | 0.50 | 0.0158 | 47.4 |
| T. Ex. A7 | Bal. | 3.5 | 0.80 | 0.050 | 0.10 | 0.0080 | | 35.00 | 0.0139 | 57.6 |
| T. Ex. A8 | Bal. | 2.0 | 0.75 | 0.070 | 7.00 | 0.0080 | | 0.29 | 0.0078 | 96.4 |
| T. Ex. A9 | Bal. | 3.5 | 0.80 | 0.050 | 1.50 | 0.0070 | | 2.33 | 0.0100 | 80.0 |
| T. Ex. A10 | Bal. | 3.5 | 0.80 | 0.050 | 1.50 | 0.0150 | | 2.33 | 0.0100 | 80.0 |
| T. Ex. A11 | Bal. | 3.5 | 0.80 | 0.050 | 1.80 | 0.0080 | | 1.94 | 0.0094 | 84.8 |
| T. Ex. A12 | Bal. | 3.5 | 0.80 | 0.050 | 1.50 | 0.0080 | | 2.33 | 0.0100 | 80.0 |
| T. Ex. A13 | Bal. | 3.5 | 0.80 | 0.050 | 0.50 | 0.0080 | 0.0080 | 7.00 | 0.0125 | 64.0 |
| T. Ex. A14 | Bal. | 2.0 | 0.75 | 0.070 | 4.00 | 0.0080 | | 0.50 | 0.0117 | 64.3 |
| T. Ex. A15 | Bal. | 3.0 | 0.75 | 0.070 | 4.00 | 0.0080 | 0.0080 | 0.75 | 0.0100 | 75.0 |

| | Thickness of IMC layer | Size of $Ag_3Sn$ | Discoloration resistance | Wettability | Strength of solder joint portion |
|---|---|---|---|---|---|
| T. Ex. A1 | A | A | A | A | A |
| T. Ex. A2 | A | B | A | A | A |

TABLE 1-continued

| | | | | | |
|---|---|---|---|---|---|
| T. Ex. A3 | A | A | A | A | A |
| T. Ex. A4 | A | A | A | A | A |
| T. Ex. A5 | A | A | A | A | A |
| T. Ex. A6 | A | A | A | A | A |
| T. Ex. A7 | A | A | A | A | A |
| T. Ex. A8 | A | A | A | A | A |
| T. Ex. A9 | A | A | A | A | A |
| T. Ex. A10 | A | A | A | A | A |
| T. Ex. A11 | A | A | A | A | A |
| T. Ex. A12 | A | A | A | A | A |
| T. Ex. A13 | A | A | A | A | A |
| T. Ex. A14 | A | A | A | A | A |
| T. Ex. A15 | A | A | A | A | A |

(T. Ex.: Test Example)

TABLE 2

| | Sn | Ag | Cu | Ni | Bi | Ge | Co | Ag/Bi | Formula (1) | Formula (2) |
|---|---|---|---|---|---|---|---|---|---|---|
| T. Ex. B1 | Bal. | 0.9 | 0.80 | 0.050 | 1.50 | 0.0080 | | 0.60 | 0.0208 | 38.4 |
| T. Ex. B2 | Bal. | 4.5 | 0.80 | 0.050 | 1.50 | 0.0080 | | 3.00 | 0.0083 | 96.0 |
| T. Ex. B3 | Bal. | 3.5 | 0.60 | 0.050 | 1.50 | 0.0080 | | 2.33 | 0.0100 | 60.0 |
| T. Ex. B4 | Bal. | 3.5 | 1.10 | 0.050 | 1.50 | 0.0080 | | 2.33 | 0.0100 | 110.0 |
| T. Ex. B5 | Bal. | 3.5 | 0.80 | 0.030 | 1.50 | 0.0080 | | 2.33 | 0.0060 | 133.3 |
| T. Ex. B6 | Bal. | 3.5 | 0.80 | 0.100 | 1.50 | 0.0080 | | 2.33 | 0.0200 | 40.0 |
| T. Ex. B7 | Bal. | 3.5 | 0.80 | 0.050 | 0.00 | 0.0080 | | — | 0.0143 | 56.0 |
| T. Ex. B8 | Bal. | 3.5 | 0.80 | 0.050 | 8.00 | 0.0080 | | 0.44 | 0.0043 | 184.0 |
| T. Ex. B9 | Bal. | 3.5 | 0.80 | 0.050 | 1.50 | 0.0060 | | 2.33 | 0.0100 | 80.0 |
| T. Ex. B10 | Bal. | 3.5 | 0.80 | 0.050 | 1.50 | 0.0160 | | 2.33 | 0.0100 | 80.0 |
| T. Ex. B11 | Bal. | 2.5 | 0.80 | 0.080 | 2.00 | 0.0080 | | 1.25 | 0.0178 | 45.0 |
| T. Ex. B12 | Bal. | 2.0 | 0.75 | 0.070 | 1.00 | 0.0080 | | 2.00 | 0.0233 | 32.1 |
| T. Ex. B13 | Bal. | 1.0 | 0.70 | 0.050 | 1.50 | 0.0060 | | 0.67 | 0.0200 | 35.0 |
| T. Ex. B14 | Bal. | 2.0 | 0.70 | 0.050 | 1.50 | 0.0060 | | 1.33 | 0.0143 | 49.0 |
| T. Ex. B15 | Bal. | 3.0 | 0.70 | 0.050 | 1.50 | 0.0060 | | 2.00 | 0.0111 | 63.0 |
| T. Ex. B16 | Bal. | 4.0 | 0.70 | 0.050 | 1.50 | 0.0060 | | 2.67 | 0.0091 | 77.0 |

| | Thickness of IMC layer | Size of Ag$_3$Sn | Discoloration resistance | Wettability | Strength of solder joint portion |
|---|---|---|---|---|---|
| T. Ex. B1 | A | A | A | B | B |
| T. Ex. B2 | A | C | A | A | B |
| T. Ex. B3 | B | A | A | A | B |
| T. Ex. B4 | B | A | A | B | B |
| T. Ex. B5 | B | A | A | A | B |
| T. Ex. B6 | B | A | A | B | B |
| T. Ex. B7 | A | A | A | B | B |
| T. Ex. B8 | A | A | A | A | B |
| T. Ex. B9 | A | A | B | A | A |
| T. Ex. B10 | A | A | A | B | B |
| T. Ex. B11 | A | A | A | B | A |
| T. Ex. B12 | A | A | A | B | A |
| T. Ex. B13 | A | A | B | B | A |
| T. Ex. B14 | A | A | B | B | A |
| T. Ex. B15 | A | A | B | A | A |
| T. Ex. B16 | A | B | B | A | A |

(T. Ex.: Test Example)

As shown in Table 1, the evaluation result of the thickness of the IMC layer was A in Test Examples A1 to A15 corresponding to the fourth embodiment or the fifth embodiment.

Furthermore, the evaluation result of the thickness of the IMC layer was A in Test Examples B1, B2, and B7 to B16, in which the amount of Cu was 0.7% by mass to 1.0% by mass and the amount of Ni was 0.040% by mass to 0.095% by mass.

On the other hand, the evaluation result of the thickness of the IMC layer was B in Test Examples B3 to B6 in which the amount of Cu or Ni was outside the above-mentioned range.

As shown in Table 1, the evaluation result of the size of Ag$_3$Sn was A or B in Test Examples A1 to A15 corresponding to the fourth embodiment or the fifth embodiment.

The evaluation result of the size of Ag$_3$Sn was A in Test Examples A1, A3 to A14, B1, and B3 to B15, in which the amount of Ag was 3.5% by mass or less.

Furthermore, the evaluation result of the size of Ag$_3$Sn was B in Test Examples A2 and B16 in which the amount of Ag was 4.0% by mass.

On the other hand, the evaluation result of the size of Ag$_3$Sn was C in Test Example B2 in which the amount of Ag exceeded 4.0% by mass.

As shown in Table 1, the evaluation result of discoloration resistance was A in Test Examples A1 to A15 corresponding to the fourth embodiment or the fifth embodiment.

Furthermore, the evaluation result of discoloration resistance was A in Test Examples B1 to B8 and B10 to B12 in which the amount of Ge was by mass or more.

On the other hand, the evaluation result of discoloration resistance was B in Test Examples B9 and B13 to B16 in which the amount of Ge was less than 0.007% by mass.

As shown in Table 1, the evaluation result of wettability was A in Test Examples A1 to A15 corresponding to the fourth embodiment or the fifth embodiment.

In addition, the evaluation result of the wettability was A in Test Examples B2, B3, B5, B8, and B9.

On the other hand, the evaluation result of wettability was B in Test Examples B1, B6, and B11 to B13, in which the following formulae: 0.017≤Ni/(Ag+Bi) and (Cu/Ni)×(Ag+Bi)≤46 were satisfied.

Furthermore, the evaluation result of wettability was B in Test Example B4 in which the amount of Cu exceeded 1.0% by mass.

Furthermore, the evaluation result of wettability was B in Test Example B7 in which the amount of Bi was less than 0.1% by mass.

Furthermore, the evaluation result of wettability was B in Test Example B10 in which the amount of Ge exceeded 0.015% by mass.

Furthermore, the evaluation result of wettability was B in Test Example B14 in which the amount of Ag or Bi was not sufficient.

As shown in Table 1, the evaluation result of the strength of the solder joint portion was A in Test Examples A1 to A15 corresponding to the fourth embodiment or the fifth embodiment.

Furthermore, the evaluation result of the strength of the solder joint portion was A in Test Examples B1 to B8, B9, and B11 to B16 in which the amount of Ag was 1.0% by mass to 4.0% by mass, the amount of Cu was by mass to 1.0% by mass, the amount of Bi was 0.1% by mass to 7.0% by mass, the amount of Ni was 0.040% by mass to 0.095% by mass, and the amount of Ge was 0.015% by mass or less.

On the other hand, the evaluation result of the strength of the solder joint portion was B in Test Examples B1 and B2 in which the amount of Ag was outside the above-mentioned range.

Furthermore, the evaluation result of the strength of the solder joint portion was B in Test Examples B3 and B4 in which the amount of Cu was outside the above-mentioned range.

Furthermore, the evaluation result of the strength of the solder joint portion was B in Test Examples B5 and B6 in which the amount of Ni was outside the above-mentioned range.

Furthermore, the evaluation result of the strength of the solder joint portion was B in Test Examples B7 and B8 in which the amount of Bi was outside the predetermined range.

Furthermore, the evaluation result of the strength of the solder joint portion was B in Test Example B10 in which the amount of Ge exceeded 0.015% by mass.

As shown above, the solder alloys of the fourth embodiment and the fifth embodiment exhibit the following effects.

The solder alloy can reduce the thickness of an intermetallic compound layer at a joint interface.

Furthermore, the solder alloy can sufficiently precipitate fine $Ag_3Sn$ and can reduce the precipitation amount of coarse $Ag_3Sn$.

Furthermore, the solder alloy of the fifth embodiment can suppress discoloration of an alloy.

Furthermore, the solder alloy of the fifth embodiment can increase the strength of the joint portion after soldering.

The solder alloy can improve the wettability.

Furthermore, the solidus temperature and the liquidus temperature were measured using the solder alloy powders prepared above in accordance with the procedure of "(1) Measurement of solidus temperature and liquidus temperature" mentioned above. Furthermore, the tensile strength was measured using the solder alloy powders prepared above in accordance with the procedure described in "(2) Measurement of tensile strength and elongation". The measurement results are shown in Tables 3 and 4.

In Test Examples A1 to A15, the melting point was around 230° C., and the tensile strength was 50 MPa or more.

TABLE 3

| | Sn | Ag | Cu | Ni | Bi | Ge | Co | Ag/Bi | Formula (1) | Formula (2) |
|---|---|---|---|---|---|---|---|---|---|---|
| T. Ex. A1 | Bal. | 1.0 | 0.80 | 0.050 | 4.00 | 0.0080 | | 0.50 | 0.0167 | 48.0 |
| T. Ex. A2 | Bal. | 4.0 | 0.80 | 0.050 | 4.00 | 0.0080 | | 2.67 | 0.0091 | 88.0 |
| T. Ex. A3 | Bal. | 3.5 | 0.70 | 0.050 | 4.00 | 0.0080 | | 2.33 | 0.0100 | 70.0 |
| T. Ex. A4 | Bal. | 3.0 | 1.00 | 0.050 | 4.00 | 0.0080 | | 2.00 | 0.0111 | 90.0 |
| T. Ex. A5 | Bal. | 3.0 | 0.80 | 0.040 | 4.00 | 0.0080 | | 2.00 | 0.0089 | 90.0 |
| T. Ex. A6 | Bal. | 2.0 | 0.75 | 0.095 | 4.00 | 0.0080 | | 0.50 | 0.0158 | 47.4 |
| T. Ex. A7 | Bal. | 3.5 | 0.80 | 0.050 | 4.00 | 0.0080 | | 35.00 | 0.0139 | 57.6 |
| T. Ex. A8 | Bal. | 2.0 | 0.75 | 0.070 | 4.00 | 0.0080 | | 0.29 | 0.0078 | 96.4 |
| T. Ex. A9 | Bal. | 3.5 | 0.80 | 0.050 | 4.00 | 0.0070 | | 2.33 | 0.0100 | 80.0 |
| T. Ex. A10 | Bal. | 3.5 | 0.80 | 0.050 | 4.00 | 0.0150 | | 2.33 | 0.0100 | 80.0 |
| T. Ex. A11 | Bal. | 3.5 | 0.80 | 0.050 | 4.00 | 0.0080 | | 1.94 | 0.0094 | 84.8 |
| T. Ex. A12 | Bal. | 3.5 | 0.80 | 0.050 | 4.00 | 0.0080 | | 2.33 | 0.0100 | 80.0 |
| T. Ex. A13 | Bal. | 3.5 | 0.80 | 0.050 | 4.00 | 0.0080 | 0.0080 | 7.00 | 0.0125 | 64.0 |
| T. Ex. A14 | Bal. | 2.0 | 0.75 | 0.070 | 4.00 | 0.0080 | | 0.50 | 0.0117 | 64.3 |
| T. Ex. A15 | Bal. | 3.0 | 0.75 | 0.070 | 4.00 | 0.0080 | 0.0080 | 0.75 | 0.0100 | 75.0 |

| | Solidus temperature (° C.) | Liquidus temperature (° C.) | ΔT (° C.) | Tensile Strength (MPa) |
|---|---|---|---|---|
| T. Ex. A1 | 214 | 225 | 11 | 55.9 |
| T. Ex. A2 | 214 | 220 | 6 | 71.3 |
| T. Ex. A3 | 214 | 220 | 6 | 67.3 |
| T. Ex. A4 | 214 | 220 | 6 | 66.3 |
| T. Ex. A5 | 214 | 220 | 6 | 64.8 |
| T. Ex. A6 | 206 | 219 | 13 | 78.7 |
| T. Ex. A7 | 217 | 221 | 4 | 56.4 |
| T. Ex. A8 | 178 | 215 | 37 | 103.6 |

TABLE 3-continued

| | | | | |
|---|---|---|---|---|
| T. Ex. A9 | 214 | 219 | 5 | 68 |
| T. Ex. A10 | 214 | 219 | 5 | 68 |
| T. Ex. A11 | 214 | 219 | 5 | 70.5 |
| T. Ex. A12 | 214 | 219 | 5 | 66.2 |
| T. Ex. A13 | 217 | 221 | 4 | 55.5 |
| T. Ex. A14 | 206 | 219 | 13 | 83.8 |
| T. Ex. A15 | 206 | 215 | 9 | 85.2 |

(T. Ex.: Test Example)

TABLE 4

| | Sn | Ag | Cu | Ni | Bi | Ge | Co | Ag/Bi | Formula (1) | Formula (2) |
|---|---|---|---|---|---|---|---|---|---|---|
| T. Ex. B1 | Bal. | 0.9 | 0.80 | 0.050 | 1.50 | 0.0080 | | 0.60 | 0.0208 | 38.4 |
| T. Ex. B2 | Bal. | 4.5 | 0.80 | 0.050 | 1.50 | 0.0080 | | 3.00 | 0.0083 | 96.0 |
| T. Ex. B3 | Bal. | 3.5 | 0.60 | 0.050 | 1.50 | 0.0080 | | 2.33 | 0.0100 | 60.0 |
| T. Ex. B4 | Bal. | 3.5 | 1.10 | 0.050 | 1.50 | 0.0080 | | 2.33 | 0.0100 | 110.0 |
| T. Ex. B5 | Bal. | 3.5 | 0.80 | 0.030 | 1.50 | 0.0080 | | 2.33 | 0.0060 | 133.3 |
| T. Ex. B6 | Bal. | 3.5 | 0.80 | 0.100 | 1.50 | 0.0080 | | 2.33 | 0.0200 | 40.0 |
| T. Ex. B7 | Bal. | 3.5 | 0.80 | 0.050 | 0.00 | 0.0080 | | — | 0.0143 | 56.0 |
| T. Ex. B8 | Bal. | 3.5 | 0.80 | 0.050 | 8.00 | 0.0080 | | 0.44 | 0.0043 | 184.0 |
| T. Ex. B9 | Bal. | 3.5 | 0.80 | 0.050 | 1.50 | 0.0060 | | 2.33 | 0.0100 | 80.0 |
| T. Ex. B10 | Bal. | 3.5 | 0.80 | 0.050 | 1.50 | 0.0160 | | 2.33 | 0.0100 | 80.0 |
| T. Ex. B11 | Bal. | 2.5 | 0.80 | 0.080 | 2.00 | 0.0080 | | 1.25 | 0.0178 | 45.0 |
| T. Ex. B12 | Bal. | 2.0 | 0.75 | 0.070 | 1.00 | 0.0080 | | 2.00 | 0.0233 | 32.1 |
| T. Ex. B13 | Bal. | 1.0 | 0.70 | 0.050 | 1.50 | 0.0060 | | 0.67 | 0.0200 | 35.0 |
| T. Ex. B14 | Bal. | 2.0 | 0.70 | 0.050 | 1.50 | 0.0060 | | 1.33 | 0.0143 | 49.0 |
| T. Ex. B15 | Bal. | 3.0 | 0.70 | 0.050 | 1.50 | 0.0060 | | 2.00 | 0.0111 | 63.0 |
| T. Ex. B16 | Bal. | 4.0 | 0.70 | 0.050 | 1.50 | 0.0060 | | 2.67 | 0.0091 | 77.0 |

| | Solidus temperature (° C.) | Liquidus temperature (° C.) | ΔT (° C.) | Tensile Strength (MPa) |
|---|---|---|---|---|
| T. Ex. B1 | 214 | 226 | 12 | 51.1 |
| T. Ex. B2 | 214 | 220 | 6 | 74.5 |
| T. Ex. B3 | 214 | 220 | 6 | 66.6 |
| T. Ex. B4 | 214 | 220 | 6 | 70.2 |
| T. Ex. B5 | 214 | 220 | 6 | 68 |
| T. Ex. B6 | 214 | 220 | 6 | 68 |
| T. Ex. B7 | 217 | 221 | 4 | 55.6 |
| T. Ex. B8 | 173 | 211 | 38 | 122 |
| T. Ex. B9 | 214 | 219 | 5 | 68 |
| T. Ex. B10 | 214 | 219 | 5 | 68 |
| T. Ex. B11 | 214 | 220 | 6 | 65.7 |
| T. Ex. B12 | 215 | 223 | 8 | 53.8 |
| T. Ex. B13 | 214 | 225 | 11 | 51.1 |
| T. Ex. B14 | 214 | 223 | 9 | 57.6 |
| T. Ex. B15 | 214 | 220 | 6 | 64.1 |
| T. Ex. B16 | 214 | 220 | 6 | 70.6 |

(T. Ex.: Test Example)

INDUSTRIAL APPLICABILITY

According to the present invention, it is possible to provide a lead-free and antimony-free solder alloy, solder ball, and solder joint having a melting point of around 230° C. and a tensile strength of 50 MPa or more. The solder alloy, solder ball, and solder joint can be suitably used in QFP.

The invention claimed is:

1. A solder alloy which is free from lead and antimony, the solder alloy having an alloy constitution consisting of: 1.0% by mass to 4.0% by mass of Ag; 0.7% by mass to 1.0% by mass of Cu; 0.1% by mass to 7.0% by mass of Bi; 0.040% by mass to 0.095% by mass of Ni; 0.007% by mass to 0.015% by mass of Ge; optionally 0.001% by mass to 0.1% by mass of Co; and a balance of Sn, wherein a difference ΔT between a liquidus temperature and a solidus temperature of the solder alloy is 40° C. or less.

2. The solder alloy according to claim 1, wherein an amount of Ag is 3.5% by mass; an amount of Cu is 0.8% by mass; an amount of Bi is 1.0% by mass to 2.0% by mass; an amount of Ni is 0.05% by mass; and an amount of Ge is 0.008% by mass.

3. The solder alloy according to claim 1, wherein an amount of Ag is 2.0% by mass; an amount of Cu is 0.8% by mass; an amount of Bi is 3.0% by mass to 5.0% by mass; an amount of Ni is 0.05% by mass; and an amount of Ge is 0.008% by mass.

4. The solder alloy according to claim 1, wherein an amount of Ag is 1.0% by mass to 3.0% by mass; an amount of Cu is 0.7% by mass to 0.9% by mass; an amount of Bi is 4.0% by mass; an amount of Ni is 0.04% by mass to 0.08% by mass; and an amount of Ge is 0.007% by mass to 0.009% by mass.

5. The solder alloy according to claim 1, wherein the alloy constitution satisfies a formula:

$$0.3 \leq Ag/Bi \leq 0.7$$

wherein Ag and Bi indicate each amount thereof (% by mass) in the alloy constitution.

6. The solder alloy according to claim 1, wherein the alloy constitution satisfies a formula:

$$0.007 < Ni/(Ag+Bi) < 0.017$$

wherein Ni, Ag and Bi indicate each amount thereof (% by mass) in the alloy constitution.

7. The solder alloy according to claim 1, wherein the alloy constitution satisfies a formula:

$$46 < (Cu/Ni) \times (Ag+Bi) < 120$$

wherein Cu, Ni, Ag and Bi indicate each amount thereof (% by mass) in the alloy constitution.

8. A solder ball formed by a solder alloy of claim 1.

9. The solder ball according to claim 8, wherein an average particle size is 1 μm to 1000 μm.

10. The solder ball according to claim 8, wherein a sphericity is 0.95 or more.

11. The solder ball according to claim 10, wherein the sphericity is 0.99 or more.

12. A ball grid array formed by a solder ball of claim 8.

13. A solder joint formed by a solder alloy of claim 1.

14. The solder alloy according to claim 1, wherein an amount of Ag is 3.0% by mass to 4.0% by mass, and wherein the alloy constitution satisfies formulae:

$$0.007 < Ni/(Ag+Bi) < 0.017$$

$$46 < (Cu/Ni) \times (Ag+Bi) < 120$$

wherein Cu, Ni, Ag and Bi indicate each amount thereof (% by mass) in the alloy constitution.

15. The solder alloy according to claim 14, wherein the amount of Ag is 3.0% by mass to 3.5% by mass; the amount of Bi is 0.3% by mass to 0.7% by mass; the amount of Ni is 0.040% by mass to 0.060% by mass; the amount of Ge is 0.007% by mass to 0.010% by mass; and the amount of Co is 0.005% by mass to 0.010% by mass.

16. The solder alloy according to claim 14, wherein the solidus temperature of the solder alloy is 170° C. to 225° C.

17. The solder alloy according to claim 1, wherein the alloy constitution satisfies formulae:

$$0.007 < Ni/(Ag+Bi) < 0.017$$

$$46 < (Cu/Ni) \times (Ag+Bi) < 120$$

$$5 \leq Ag/Bi \leq 15$$

wherein Cu, Ni, Ag and Bi indicate each amount thereof (% by mass) in the alloy constitution.

18. The solder alloy according to claim 1, wherein the solidus temperature of the solder alloy is 170° C. to 225° C.

19. The solder alloy according to claim 1, wherein the solder alloy is in a form of powders in which a mass fraction of powders having a particle size of 5 μm to 15 μm is 80% or more with respect to a total mass of the solder alloy.

20. The solder alloy according to claim 1, wherein the solder alloy satisfies:

a thickness of an intermetallic compound layer, measured in accordance with a specification, is less than 1.4 μm;

a maximum length of $Ag_3Sn$, measured in accordance with the specification, is less than 5 μm;

a wet spread length, measured in accordance with the specification, is 1000 μm or more; and a ratio of a number of tests in which an intermetallic compound layer is destroyed relative to a total number of tests, carried out in accordance with the specification, is 50% or less.

21. The solder alloy according to claim 1, wherein an amount of Ag is 3.0% by mass to 4.0% by mass.

* * * * *